(12) United States Patent
Kim

(10) Patent No.: US 10,124,799 B2
(45) Date of Patent: *Nov. 13, 2018

(54) VEHICLE SAFETY CONTROL APPARATUS AND METHOD USING CAMERAS

(71) Applicant: MANDO CORPORATION, Pyeongtaek-si (KR)

(72) Inventor: Myung-Woo Kim, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 95 days.

This patent is subject to a terminal disclaimer.

(21) Appl. No.: 14/308,447

(22) Filed: Jun. 18, 2014

(65) Prior Publication Data

US 2015/0042802 A1   Feb. 12, 2015

(30) Foreign Application Priority Data

Aug. 12, 2013 (KR) .................. 10-2013-0095103

(51) Int. Cl.
  *B60W 30/08* (2012.01)
  *G06K 9/62* (2006.01)
  *G06K 9/00* (2006.01)

(52) U.S. Cl.
  CPC ......... *B60W 30/08* (2013.01); *G06K 9/00791* (2013.01); *G06K 9/00825* (2013.01);
  (Continued)

(58) Field of Classification Search
  None
  See application file for complete search history.

(56) References Cited

U.S. PATENT DOCUMENTS

| 2003/0025791 A1* | 2/2003 | Kaylor | ............. G08B 13/19628 |
| | | | 348/143 |
| 2006/0098843 A1* | 5/2006 | Chew | ....................... B61K 9/08 |
| | | | 382/103 |

(Continued)

FOREIGN PATENT DOCUMENTS

| CN | 101641725 | 2/2010 |
| CN | 101844545 | 9/2010 |

(Continued)

OTHER PUBLICATIONS

Office Action dated Feb. 4, 2015 for German Patent Application No. 10 2014 009 083.3 and its English summary provided by Applicant's foreign counsel.

(Continued)

*Primary Examiner* — Edemio Navas, Jr.
(74) *Attorney, Agent, or Firm* — Ladas & Parry, LLP

(57) ABSTRACT

A vehicle safety control apparatus using cameras includes a first camera configured to photograph light and shade of a current object during running, a second camera configured to photograph a color of the current object during the running, an image processing unit configured to perform image processing on first current object image data captured by the first camera and second current object image data captured by the second camera, a recognition unit configured to recognize the first and second current object image data on which the image processing unit has performed the image processing, a storage unit configured to cause the recognized data to match preset reference object-specific data and separately store the data matching the preset reference object-specific data; and a control unit configured to receive the recognized data and deliver a storage command to the storage unit.

18 Claims, 18 Drawing Sheets

(52) U.S. Cl.
CPC ......... *G06K 9/6201* (2013.01); *G06K 9/6289* (2013.01); *B60R 2300/80* (2013.01)

(56) References Cited

U.S. PATENT DOCUMENTS

| | | | |
|---|---|---|---|
| 2007/0075892 | A1 | 4/2007 | Horibe |
| 2008/0199069 | A1* | 8/2008 | Schick .................... G01S 11/12 382/154 |
| 2011/0010094 | A1* | 1/2011 | Simon ................... B60W 30/16 701/301 |
| 2011/0116162 | A1* | 5/2011 | Tsujimura .......... G02B 27/0006 359/359 |
| 2012/0300074 | A1* | 11/2012 | Hasegawa .............. H04N 5/235 348/148 |
| 2012/0327195 | A1* | 12/2012 | Cheng ................ H04N 5/23212 348/47 |
| 2013/0124575 | A1* | 5/2013 | Plache ............... G05B 19/4183 707/800 |

FOREIGN PATENT DOCUMENTS

| | | |
|---|---|---|
| CN | 102238336 | 11/2011 |
| CN | 102438154 | 5/2012 |
| CN | 102774324 | 11/2012 |
| KR | 10-2013-0007243 | 1/2013 |

OTHER PUBLICATIONS

Thomanek. Jan, et al.: Comparing Visual Data Fusion Techniques Using FIR and Visible Light Sensors to Improve Pedestrian Detection. 2011 International Conference on Digital Image Computing: Techniques and Applications (DICTA). IEEE, 2011, pp. 119-125. Doi: 10.1109/DICTA.2011.27.

Summons to Oral Hearing dated Aug. 25, 2015 for German Patent Application No. 10 2014 009 083.3 and machine translation by Google translate.

Geronimo, David, et al.: "Survey of Pedestrian Detection for Advanced Driver Assistance Systems". IEEE Transactions on Pattern Analysis and Machine Intelligence, vol. 32, No. 7, Jul. 2010, pp. 1239-1258.

Soga, Mineki, et al.: "Pedestrian Detection for a Near Infrared Imaging System". Proceedings of the 11th International IEEE Conference on Intelligent Transportation Systems, Beijing, China, Oct. 12-15, 2008, pp. 1167-1172.

Görmer, Steffen, et al.: "Vehicle Recognition and TTC Estimation at Night based on Spotlight Pairing", Proceedings of the 12th International IEEE Conference on Intelligent Transportation Systems, St. Louis, MO, USA, Oct. 3-7, 2009, pp. 196-201.

Zaklouta, Fatin, et al. : "Real-Time Traffic-Sign Recognition Using Tree Classifiers", IEEE Transactions on Intelligent Transportation Systems, vol. 13, No. 4, Dec. 2012, pp. 1507-1514.

Alcantarilla, P.F. et al.: "Night Time Vehicle Detection for Driving Assistance LightBeam Controller", 2008 IEEE Intelligent Vehicle Symposium, Eindhoven University of Technology, Eindhoven, The Netherlands, Jun. 4-6, 2008, pp. 291-296.

Notice of Allowance dated Mar. 21, 2017 for Korean Patent Application No. 10-2013-0095103 and English translation provided by Applicant's foreign counsel.

Office Action dated Jan. 26, 2017 for Chinese Patent Application No. 201410334745.1 and its English machine translation by Google Translate.

Office Action dated Jul. 5, 2016 for German Patent Application No. 10 2014 009 083.3 and English translation provided by Applicant's foreign counsel.

Koyama, Shinzo, et al.: "A Day and Night Vision MOS Imager with Robust Photonic-Crystal-Based RGB- and -IR", IEEE Transaction on Electron Devices, vol. 55.No. 3, Mar. 2008, pp. 754-759.

Office Action dated Aug. 15, 2017 for Chinese Patent Application No. 201410334745.1 and its English translation by Google Translate.

* cited by examiner

VEHICLE SAFETY CONTROL APPARATUS AND METHOD USING CAMERAS

CROSS-REFERENCE TO RELATED APPLICATION

This application claims the benefit of Korean Patent Application No. 10-2013-0095103, filed on Aug. 12, 2013 in the Korean Intellectual Property Office, the disclosure of which is incorporated in its entirety herein by reference.

BACKGROUND

1. Field

Embodiments of the present invention relate to a vehicle safety control apparatus and method using cameras.

2. Description of the Related Art

In general, in order to improve a field of view at night, a camera having a bright lens of a low F-number or an infrared (IR) camera is used as a camera installed in a conventional vehicle.

However, the conventional camera is disadvantageous in that a color of at least one light source of a headlight and a taillight of another vehicle and a signal light is not properly represented (saturation).

On the other hand, the IR camera is not used in the daytime at which illumination is high. Also, a 650 nm cut-off camera as the conventional camera does not photograph a lane covered with a shade (guardrail or tree) or does not generate images of a lane, other vehicles, etc. in a tunnel.

Because this conventional camera has limitation in providing convenience of driving a the driver unfamiliar with the driving due to degradation of the recognition rate for a current object during running, there is limitation in preventing a traffic accident from occurring in advance.

Accordingly, research on an improved vehicle safety control apparatus and method using cameras for preventing a traffic accident from occurring in advance while providing convenience of driving for the driver by efficiently increasing an image recognition rate for a current object during running has recently continued.

SUMMARY

Therefore, it is one aspect of the present invention to provide a vehicle safety control apparatus and method using cameras that may prevent a traffic accident from occurring in advance while providing convenience of driving for a driver because an image recognition rate may be efficiently increased for a current object during running.

It is another aspect of the present invention to provide a vehicle safety control apparatus and method using cameras that may further prevent a traffic accident from occurring in advance because it is possible to induce a driver to carefully drive during running.

Additional aspects of the invention will be set forth in part in the description which follows and, in part, will be obvious from the description, or may be learned by practice of the invention.

In accordance with one aspect of the present invention, a vehicle safety control apparatus using cameras includes: a first camera configured to photograph light and shade of a current object during running; a second camera configured to photograph a color of the current object during the running; an image processing unit configured to perform image processing on first current object image data captured by the first camera and second current object image data captured by the second camera; a recognition unit configured to recognize the first and second current object image data on which the image processing unit has performed the image processing; a storage unit configured to cause the first and second current object image data recognized by the recognition unit to match preset reference object-specific data and separately store the first and second current object image data matching the reference object-specific data; and a control unit configured to receive the first and second current object image data recognized by the recognition unit and deliver a storage command to the storage unit so that the first and second current object image data matching the reference object-specific data are separately stored.

In accordance with another aspect of the present invention, a vehicle safety control apparatus using cameras includes: a first camera configured to photograph light and shade of a current object during running; a second camera configured to photograph a color of the current object during the running; an image processing unit configured to perform image processing on first current object image data captured by the first camera and second current object image data captured by the second camera; a recognition unit configured to recognize the first and second current object image data on which the image processing unit has performed the image processing; a selection unit configured to select a matching mode for causing the first and second current object image data recognized by the recognition unit to match preset reference object-specific data; a storage unit configured to separately store the first and second current object image data matching the preset reference object-specific data in the selection unit; and a control unit configured to receive the first and second current object image data recognized by the recognition unit and deliver a selection command in the matching mode for causing the first and second current object image data recognized by the recognition unit to match the reference object-specific data.

In accordance with still another aspect of the present invention, the first camera may include a bright lens configured to capture a bright image by passing IR light.

In accordance with still another aspect of the present invention, the second camera may include a dark lens configured to capture a dark image by blocking IR light.

In accordance with still another aspect of the present invention, the first current object image data may represent at least one of a lane, another vehicle, a pedestrian, and a signal sign.

In accordance with still another aspect of the present invention, the second current object image data may represent a light source.

In accordance with still another aspect of the present invention, the light source may be at least one of a headlight and a taillight of the other vehicle and a signal light.

In accordance with still another aspect of the present invention, the vehicle safety control apparatus using the cameras may further include: a first identification unit configured to cause a current matching state for the reference object-specific data to be identified when the first and second current object image data are caused to match the reference object-specific data in the storage unit according to control of the control unit.

In accordance with still another aspect of the present invention, the vehicle safety control apparatus using the cameras may further include: a second identification unit configured to cause a state in which current object images are separately stored to be identified when the first and second current object image data matching the reference object-specific data are separately stored in the storage unit.

In accordance with still another aspect of the present invention, the vehicle safety control apparatus using the cameras may further include: a third identification unit configured to cause a current matching state for the reference object-specific data to be identified when the first and second current object image data are caused to match the reference object-specific data in the selection unit according to control of the control unit.

In accordance with still another aspect of the present invention, a vehicle safety control method using cameras includes: photographing, by a first camera, light and shade of a current object and photographing, by a second camera, a color of the current object during running; performing, by an image processing unit, image processing on first current object image data captured by the first camera and second current object image data captured by the second camera; recognizing, by a recognition unit, the first and second current object image data on which the image processing unit has performed the image processing; and causing, by a storage unit, the first and second current object image data recognized by the recognition unit to match preset reference object-specific data and separately storing, by the storage unit, the first and second current object image data matching the reference object-specific data.

In accordance with still another aspect of the present invention, a vehicle safety control method using cameras includes: photographing, by a first camera, light and shade of a current object and photographing, by a second camera, a color of the current object during running; performing, by an image processing unit, image processing on first current object image data captured by the first camera and second current object image data captured by the second camera; recognizing, by a recognition unit, the first and second current object image data on which the image processing unit has performed the image processing; selecting, by a selection unit, a matching mode for causing the first and second current object image data recognized by the recognition unit to match preset reference object-specific data; and separately storing, by a storage unit, the first and second current object image data matching the preset reference object-specific data in the selection unit.

In accordance with still another aspect of the present invention, the vehicle safety control method using the cameras may further include: causing, by a first identification unit, a current matching state for the reference object-specific data to be identified when the first and second current object image data are caused to match the reference object-specific data in the storage unit according to control of a control unit.

In accordance with still another aspect of the present invention, the vehicle safety control method using the cameras may further include: causing, by a second identification unit, a state in which current object images are separately stored to be identified when the first and second current object image data matching the reference object-specific data are separately stored in the storage unit.

In accordance with still another aspect of the present invention, the vehicle safety control method using the cameras may further include: causing, by a third identification unit, a current matching state for the reference object-specific data to be identified when the first and second current object image data are caused to match the reference object-specific data in the selection unit according to control of the control unit.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Preferred embodiments of the present invention will be described in detail below with reference to the accompanying drawings.

Figure 1:
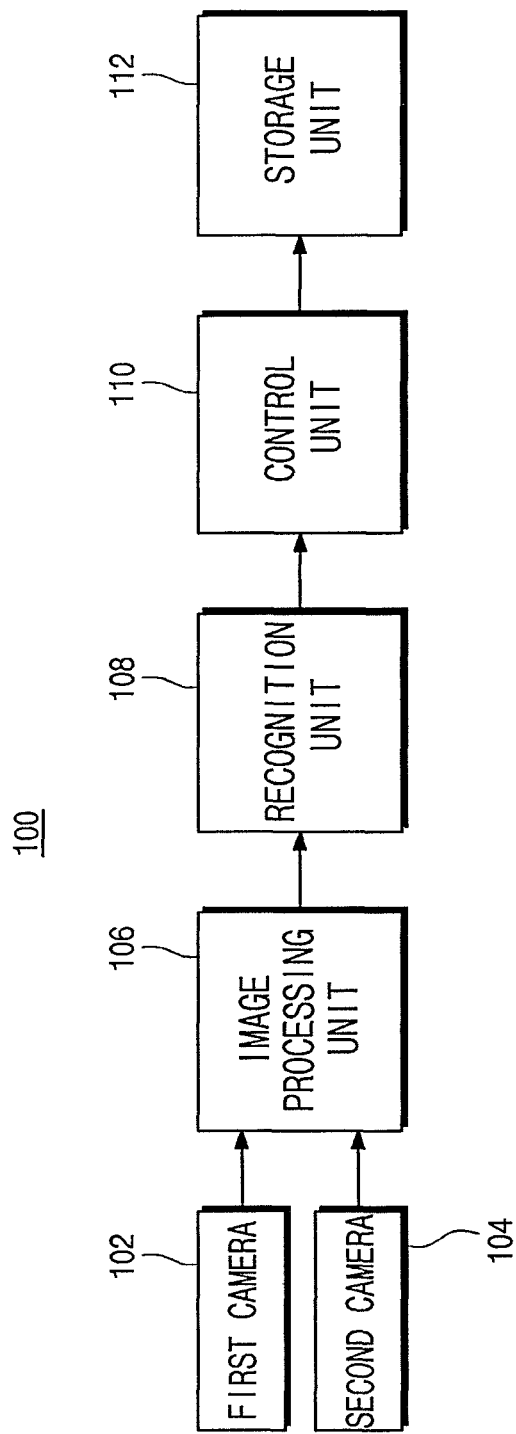
FIG. 1 is a block configuration diagram illustrating a vehicle safety control apparatus using cameras according to a first embodiment of the present invention.

FIG. 1 is a block configuration diagram illustrating a vehicle safety control apparatus using cameras according to a first embodiment of the present invention.

Referring to FIG. 1, the vehicle safety control apparatus 100 using the cameras according to the first embodiment of the present invention includes a first camera 102, a second camera 104, an image processing unit 106, a recognition unit 108, a control unit 110, and a storage unit 112.

The first camera 102 is provided to photograph light and shade of a current object during running, and the second camera 104 is provided to photograph a color of the current object during the running.

Here, although no illustrated, the first camera 102 may include a bright lens (not illustrated) configured to capture a bright image by passing IR light, and the second camera 104 may include a dark lens (not illustrated) configured to capture a dark image by blocking IR light.

Here, the bright lens (not illustrated) of the first camera 102 may be a lens having an F-number of 2.8 or less, and the dark lens (not illustrated) of the second camera 104 may be a lens having an F-number of 2.8 or more.

For example, in the daytime, the first camera 102 including an IR cutoff filter at a wavelength of 700 nm to 750 nm and a gray level sensor (not illustrated) may be used to compensate for a relatively dark shadow part. Inside a tunnel or at night, the second camera 104 including an IR cutoff filter at a wavelength of 650 nm to 680 nm and a color sensor (not illustrated) may be used to compensate for a relatively weak color part.

Here, the first camera 102 is able to recognize another vehicle, a lane, a pedestrian, a signal sign, and a light source at a specific brightness level at night, and the second camera 104 is able to recognize colors of a headlight and a taillight of the other vehicle, a color of a signal light, and a frame color of a signal sign at a specific color level.

The image processing unit 106 is provided to perform image processing on first current object image data captured by the first camera 102 and second current object image data captured by the second camera 104.

Here, the first current object image data may represent at least one of a lane, another vehicle, a pedestrian, and a signal sign, the second current object image data may represent a light source, and the light source may be at least one of a headlight and a taillight of the other vehicle and a signal light.

Here, although not illustrated, the image processing unit 106 may include a normal image processor (not illustrated), and the present invention is not limited thereto. Any image processing means for processing an image may be used.

The recognition unit 108 is provided to recognize the first and second current object image data on which the image processing unit 106 has performed the image processing.

Here, the recognition unit 108 may extract and recognize a contour of at least one of a lane, another vehicle, a pedestrian, and a signal sign represented by the first current object image data on which the image processing unit 106 has performed the image processing, and may extract and recognize a contour of at least one of a headlight and a taillight of the other vehicle and a signal light corresponding to the light source of the second current object image data.

Here, although not illustrated, the recognition unit 108 may include a normal image recognition sensor (not illustrated), and the present invention is not limited thereto. Any image data recognition means for recognizing image data may be used.

The storage unit 112 is provided to cause the first and second current object image data recognized by the recognition unit 108 to match preset reference object-specific data, and separately store the first and second current object image data matching the reference object-specific data.

That is, the storage unit 112 may be provided to cause the first and second current object image data recognized by the recognition unit 108 to match the reference object-specific data set in a lookup table, and separately store the first and second current object image data matching the reference object-specific data.

For example, the storage unit 112 may store the first current object image data representing at least one of a lane, another vehicle, a pedestrian, and a signal sign matching the reference object-specific data and the second current object image data representing at least one light source of a headlight and a taillight of the other vehicle and a signal light matching the reference object-specific data.

Here, the storage unit 112 may include a normal memory (not illustrated). For example, the storage unit 112 may be a normal secure digital (SD) memory card (not illustrated), and the present invention is not limited thereto. Any storage means for storing image data may be used.

The control unit 110 receives the first and second current object image data recognized by the recognition unit 108 and delivers a storage command to the storage unit 112 so that the first and second current object image data matching the reference object-specific data are separately stored.

Here, although not illustrated, the control unit 110 may be provided to include a normal micro control unit (MCU) (not illustrated) for controlling an overall operation of a processor, a memory, and an input/output device provided within a single chip, and the present invention is not limited thereto. Any control means capable of controlling an overall operation of a vehicle may be used.

A vehicle safety control method for use in the vehicle safety control apparatus 100 using the cameras according to the first embodiment of the present invention will be described with reference to FIGS. 2 and 3.

Figure 2:
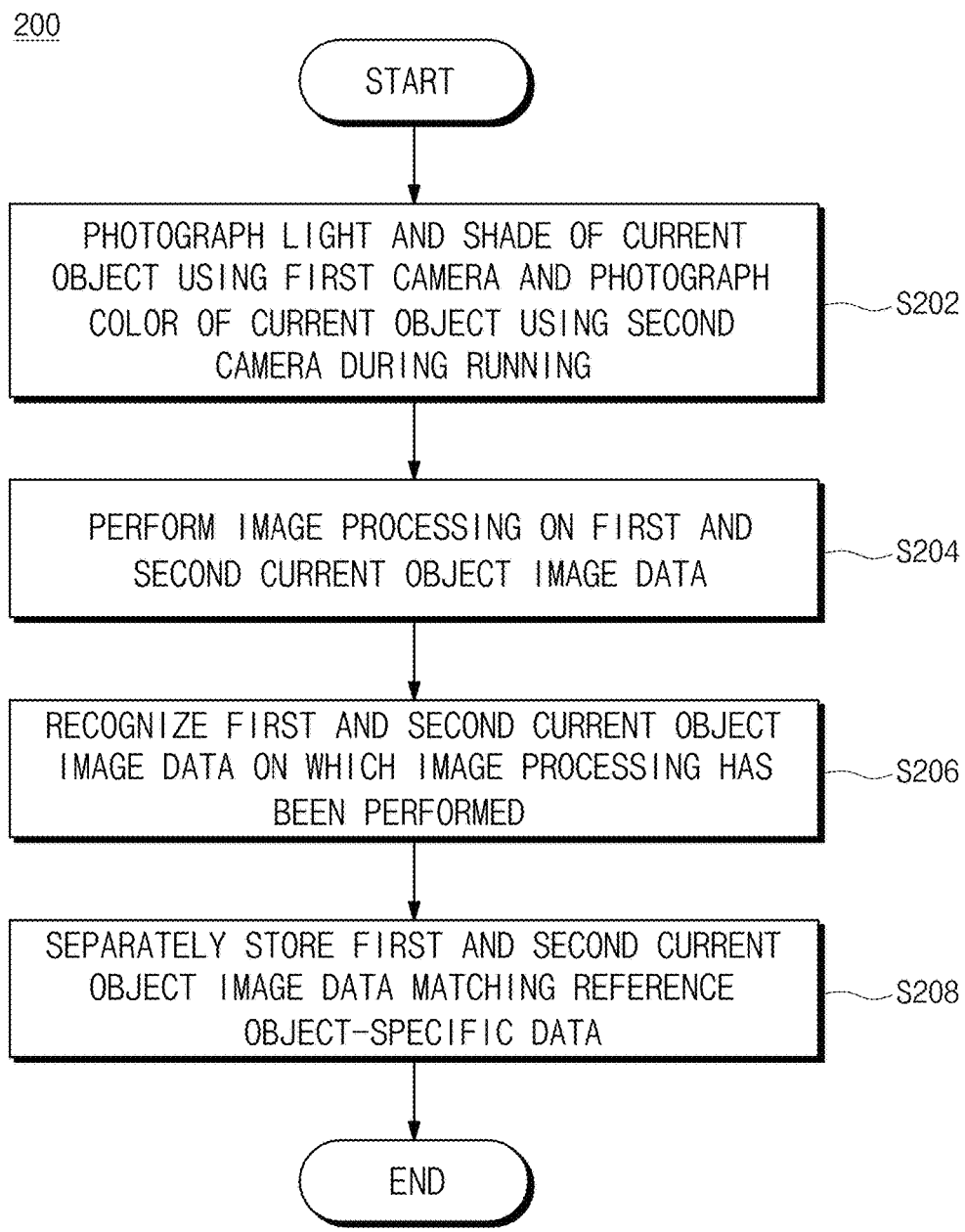
FIG. 2 is a flowchart illustrating a vehicle safety control method for use in the vehicle safety control apparatus using the cameras according to the first embodiment of the present invention.
Figure 3:
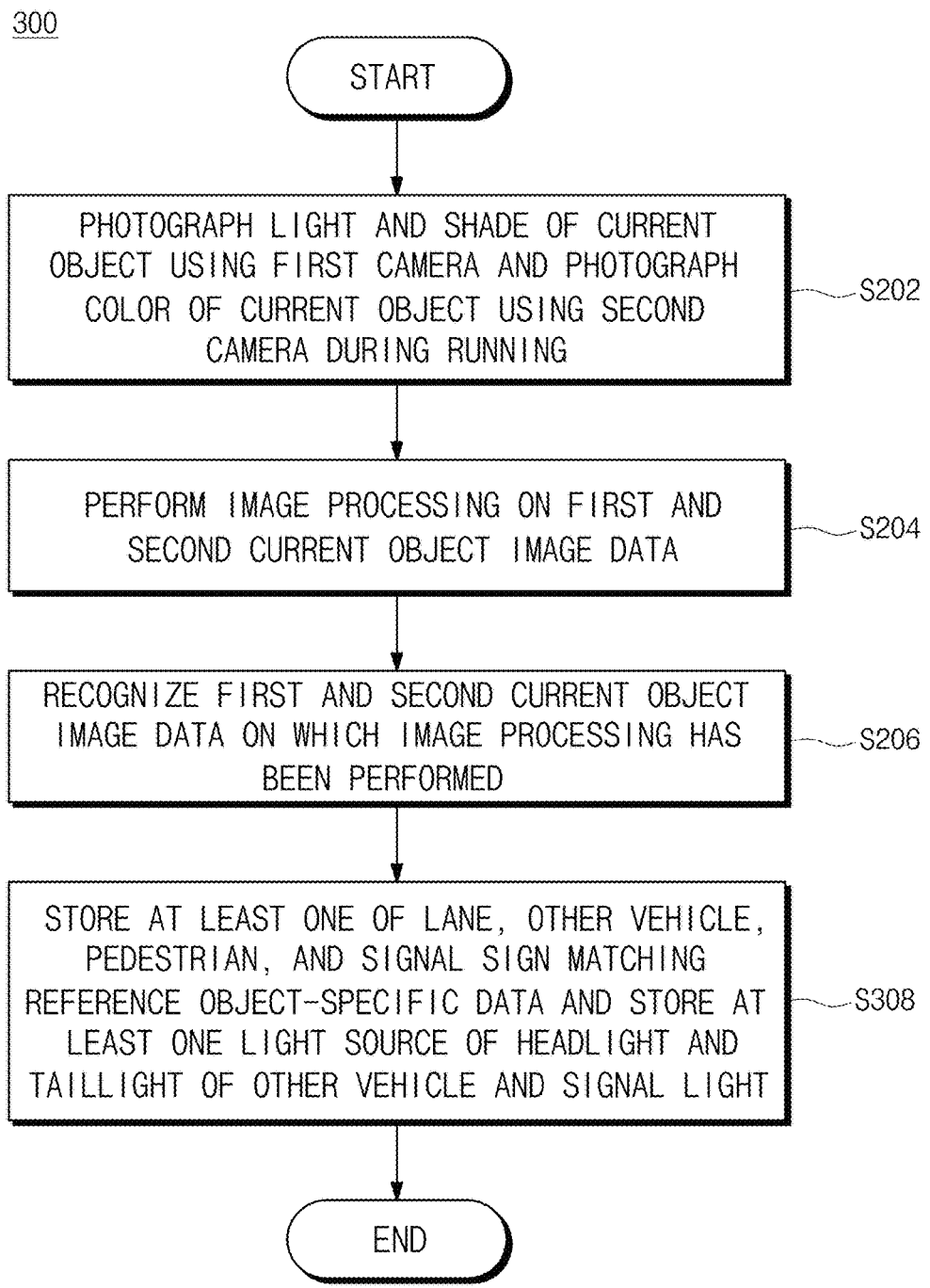
FIG. 3 is a flowchart illustrating an example of the vehicle safety control method for use in the vehicle safety control apparatus using the cameras according to the first embodiment of the present invention.

FIG. 2 is a flowchart illustrating the vehicle safety control method for use in the vehicle safety control apparatus using the cameras according to the first embodiment of the present invention, and FIG. 3 is a flowchart illustrating an example of the vehicle safety control method for use in the vehicle safety control apparatus using the cameras according to the first embodiment of the present invention.

Referring to FIGS. 2 and 3, vehicle safety control methods 200 and 300 for use in the vehicle safety control apparatus (100 in FIG. 1) using the cameras according to the first embodiment of the present invention include a photographing step S202, an image processing step S204, a recognition step S206, and storage steps S208 and S308.

First, in the photographing step S202, during running, the first camera (102 in FIG. 1) photographs light and shade of a current object and the second camera (104 in FIG. 1) photographs a color of the current object.

Thereafter, in the image processing step S204, the image processing unit (106 in FIG. 1) performs image processing on first current object image data captured by the first camera (102 in FIG. 1) and second current object image data captured by the second camera (104 in FIG. 1).

Thereafter, in the recognition step S206, the recognition unit (108 in FIG. 1) recognizes the first and second current object image data on which the image processing unit (106 in FIG. 1) has performed the image processing.

Finally, in the storage step S208, the first and second current object image data recognized by the recognition unit (108 in FIG. 1) are caused to match the preset reference object-specific data in the storage unit (112 in FIG. 1), and the first and second current object image data matching the reference object-specific data are separately stored in the storage unit (112 in FIG. 1).

That is, in the storage step S208, the first and second current object image data recognized by the recognition unit (108 in FIG. 1) may be caused to match the reference object-specific data set in a lookup table in the storage unit (112 in FIG. 1), and the first and second current object image data matching the reference object-specific data may be separately stored in the storage unit (112 in FIG. 1).

For example, as illustrated in FIG. 3, in the storage step S308, the first current object image data representing at least one of a lane, another vehicle, a pedestrian, and a signal sign matching the reference object-specific data and the second current object image data representing at least one light source of a headlight and a taillight of the other vehicle and a signal light matching the reference object-specific data may be stored.

As described above, in the vehicle safety control apparatus 100 using the cameras according to the first embodiment of the present invention including the first camera 102, the second camera 104, the image processing unit 106, the recognition unit 108, the control unit 110, and the storage unit 112, the vehicle safety control methods 200 and 300 including the photographing step S202, the image processing step S204, the recognition step S206, and the storage steps S208 and S308 are performed.

Accordingly, in the vehicle safety control apparatus 100 and the vehicle safety control methods 200 and 300 using the cameras according to the first embodiment of the present invention, the first camera 102 photographs a current object representing at least one of a lane, another vehicle, a pedestrian, and a signal sign by passing IR light using the bright lens for capturing a bright image, the second camera 104 photographs a current object representing at least one light source of a headlight and a taillight of the other vehicle and a signal light by blocking IR light using the dark lens for capturing a dark image, and the current object representing the at least one of the lane, the other vehicle, the pedestrian, and the signal sign photographed by the bright lens using the first camera 102 and the current object representing the at least one light source of the headlight and the taillight of the other vehicle and the signal light photographed by the dark lens using the second camera 104 may be separately stored in the storage unit 112.

According to the vehicle safety control apparatus 100 and the vehicle safety control methods 200 and 300 using the cameras according to the first embodiment of the present invention, it is possible to prevent a traffic accident from occurring in advance while providing convenience of driving for a driver because an image recognition rate may be efficiently increased for a current object during running.

Figure 4:
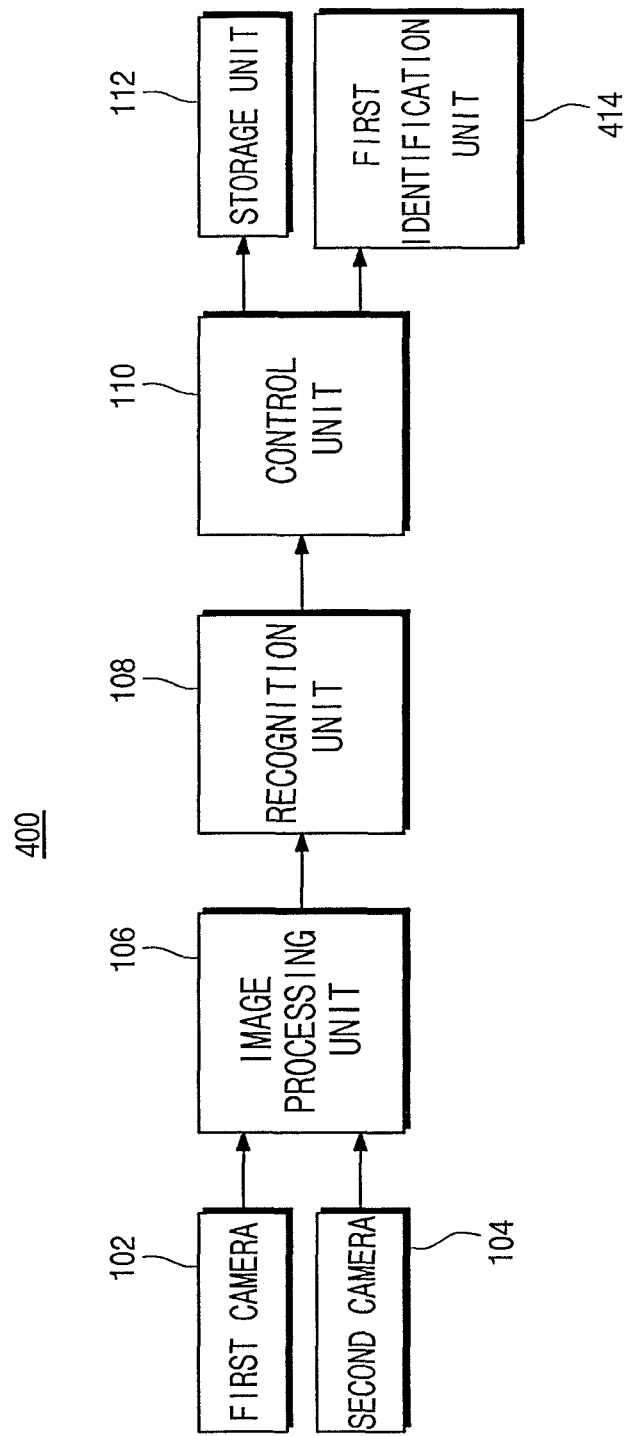
FIG. 4 is a block configuration diagram illustrating a vehicle safety control apparatus using cameras according to a second embodiment of the present invention.

FIG. 4 is a block configuration diagram illustrating a vehicle safety control apparatus using cameras according to a second embodiment of the present invention.

Referring to FIG. 4, like the vehicle safety control apparatus (100 in FIG. 1) using the cameras according to the first embodiment of the present invention, the vehicle safety control apparatus 400 using the cameras according to the second embodiment of the present invention includes a first camera 102, a second camera 104, an image processing unit 106, a recognition unit 108, a control unit 110, and a storage unit 112.

Functions and organic connection relations of elements of the vehicle safety control apparatus 400 using the cameras according to the second embodiment of the present invention are the same as those of the vehicle safety control apparatus (100 in FIG. 1) using the cameras according to the first embodiment of the present invention, and a detailed description thereof will thus be omitted.

Here, the vehicle safety control apparatus 400 using the cameras according to the second embodiment of the present invention further includes a first identification unit 414.

That is, the first identification unit 414 causes a current matching state for reference object-specific data to be identified when the first and second current object image data are caused to match the reference object-specific data in the storage unit 112 according to control of the control unit 110.

Here, although not illustrated, the first identification unit 414 may include at least one of an alarm (not illustrated), a speaker (not illustrated), and a light-emitting member (not illustrated) provided to allow a driver to identify information or a state of a vehicle, and at least one of a human machine interface (HMI) module (not illustrated) and a head-up display (HUD) module (not illustrated) mounted to form an interface between a user and a machine to allow a driver to recognize information or a state of a vehicle, and, thus cause the current matching state for the reference object-specific data to be identified through at least one of an alarm operation of the alarm (not illustrated), a voice operation of the speaker (not illustrated), a light emitting operation of the light emitting member (not illustrated), an HMI message display operation of the HMI module (not illustrated), and an HUD message display operation of the HUD module (not illustrated).

A vehicle safety control method for use in the vehicle safety control apparatus 400 using the cameras according to the second embodiment of the present invention will be described with reference to FIGS. 5 and 6.

Figure 5:
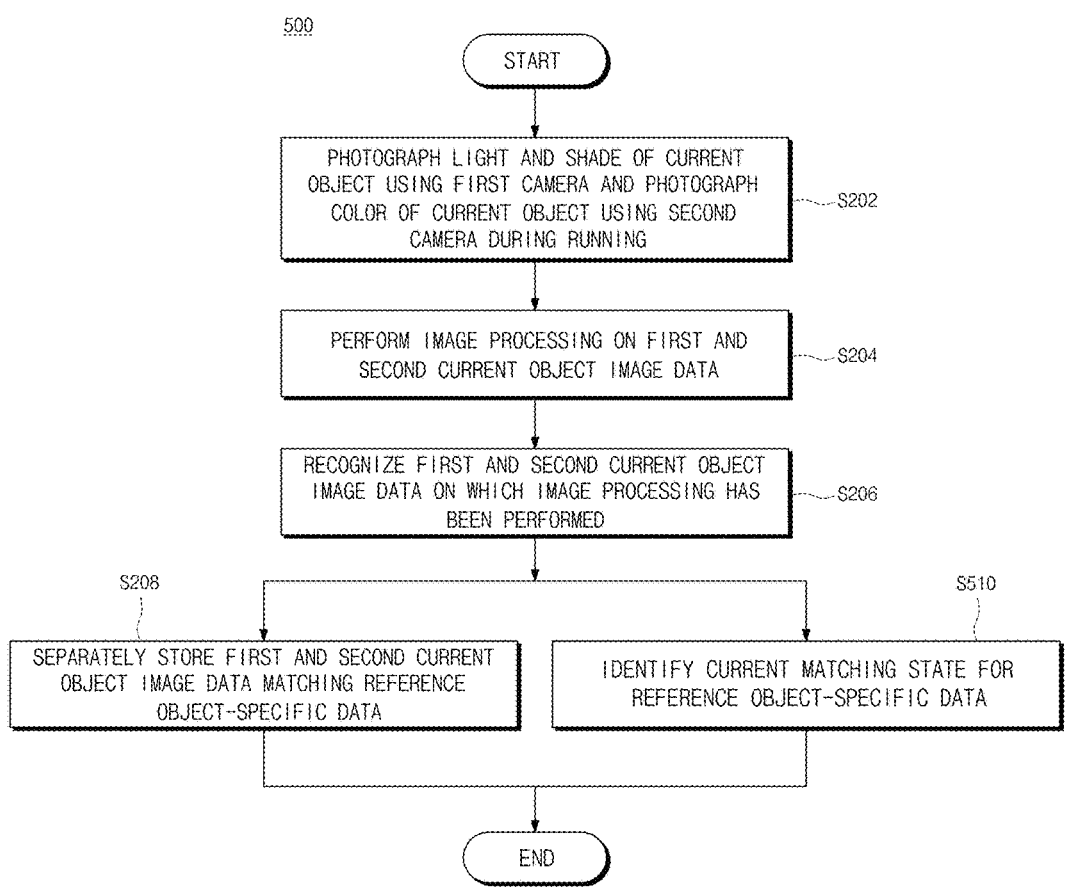
FIG. 5 is a flowchart illustrating a vehicle safety control method for use in the vehicle safety control apparatus using the cameras according to the second embodiment of the present invention.
Figure 6:
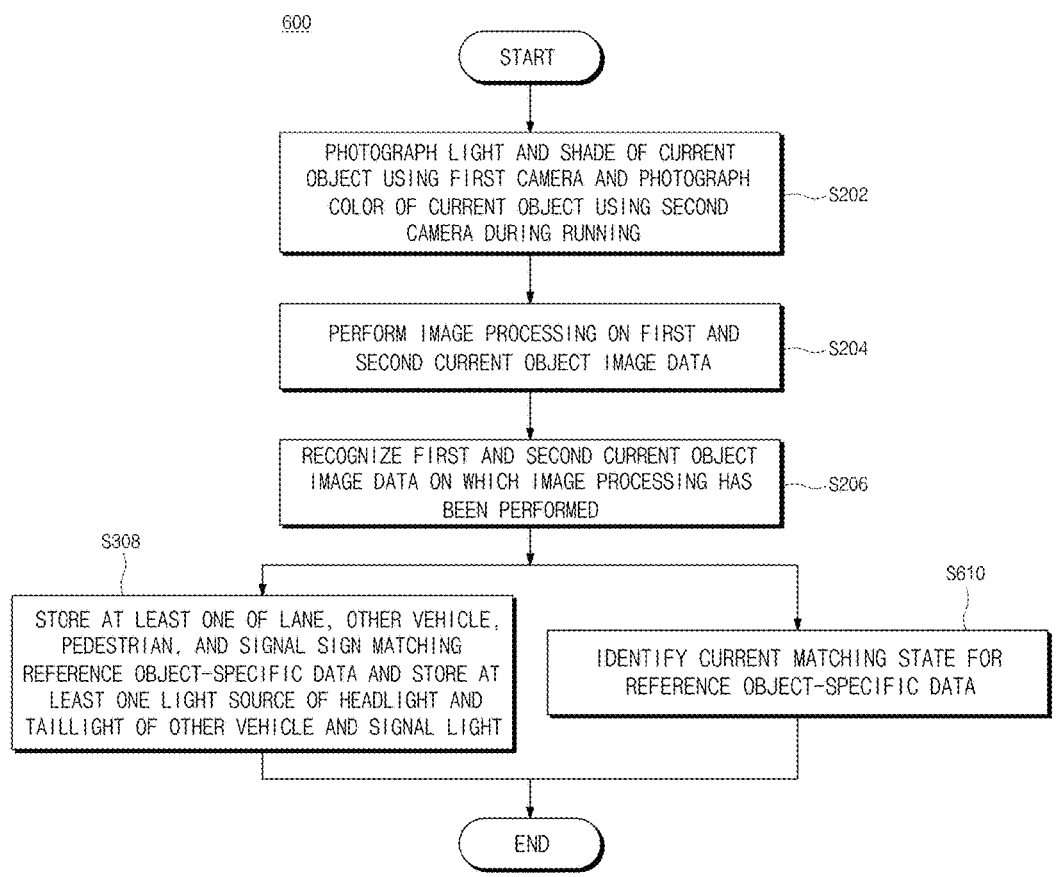
FIG. 6 is a flowchart illustrating an example of the vehicle safety control method for use in the vehicle safety control apparatus using the cameras according to the second embodiment of the present invention.

FIG. 5 is a flowchart illustrating the vehicle safety control method for use in the vehicle safety control apparatus using the cameras according to the second embodiment of the present invention, and FIG. 6 is a flowchart illustrating an example of the vehicle safety control method for use in the vehicle safety control apparatus using the cameras according to the second embodiment of the present invention.

Referring to FIGS. 5 and 6, like the vehicle safety control methods (200 and 300 in FIGS. 2 and 3) for use in the vehicle safety control apparatus (100 in FIG. 1) using the cameras according to the first embodiment of the present invention, vehicle safety control methods 500 and 600 for use in the vehicle safety control apparatus (400 in FIG. 4) using the cameras according to the second embodiment of the present invention include a photographing step S202, an image processing step S204, a recognition step S206, and storage steps S208 and S308.

Functions and organic connection relations of steps of the vehicle safety control methods 500 and 600 for use in the vehicle safety control apparatus (400 in FIG. 4) using the cameras according to the second embodiment of the present invention are the same as those of the vehicle safety control methods (200 and 300 in FIGS. 2 and 3) for use in the vehicle safety control apparatus (100 in FIG. 1) using the cameras according to the first embodiment of the present invention, and a detailed description thereof will thus be omitted.

Here, the vehicle safety control methods 500 and 600 for use in the vehicle safety control apparatus (400 in FIG. 4) using the cameras according to the second embodiment of the present invention further include first identification steps S510 and S610 to be performed in synchronization with the storage steps S208 and S308.

That is, in the first identification steps S510 and S610, the first identification unit (414 in FIG. 4) causes a current matching state for the reference object-specific data to be identified when the first and second current object image data are caused to match the reference object-specific data in the storage unit (112 in FIG. 4) according to control of the control unit (110 in FIG. 4).

As described above, in the vehicle safety control apparatus 400 using the cameras according to the second embodiment of the present invention including the first camera 102, the second camera 104, the image processing unit 106, the recognition unit 108, the control unit 110, the storage unit 112, and the first identification unit 414, the vehicle safety control methods 500 and 600 including the photographing step S202, the image processing step S204, the recognition step S206, the storage steps S208 and S308, and the first identification steps S510 and S610 are performed.

Accordingly, in the vehicle safety control apparatus 400 and the vehicle safety control methods 500 and 600 using the cameras according to the second embodiment of the present invention, the first camera 102 photographs a current object representing at least one of a lane, another vehicle, a pedestrian, and a signal sign by passing IR light using the bright lens for capturing a bright image, the second camera 104 photographs a current object representing at least one light source of a headlight and a taillight of the other vehicle and a signal light by blocking IR light using the dark lens for capturing a dark image, and the current object representing the at least one of the lane, the other vehicle, the pedestrian, and the signal sign photographed by the bright lens using the first camera 102 and the current object representing the at least one light source of the headlight and the taillight of the other vehicle and the signal light photographed by the dark lens using the second camera 104 may be separately stored in the storage unit 112.

In addition, according to the vehicle safety control apparatus 400 and the vehicle safety control methods 500 and 600 using the cameras according to the second embodiment of the present invention, the first identification unit (414 in FIG. 4) may cause a current matching state for the reference object-specific data to be identified.

According to the vehicle safety control apparatus 400 and the vehicle safety control methods 500 and 600 using the cameras according to the second embodiment of the present invention, it is possible to induce a driver to carefully drive during running and further prevent a traffic accident from occurring in advance because the driver may recognize a state in which the current object currently matches the reference object-specific data in the storage unit 112.

Figure 7:
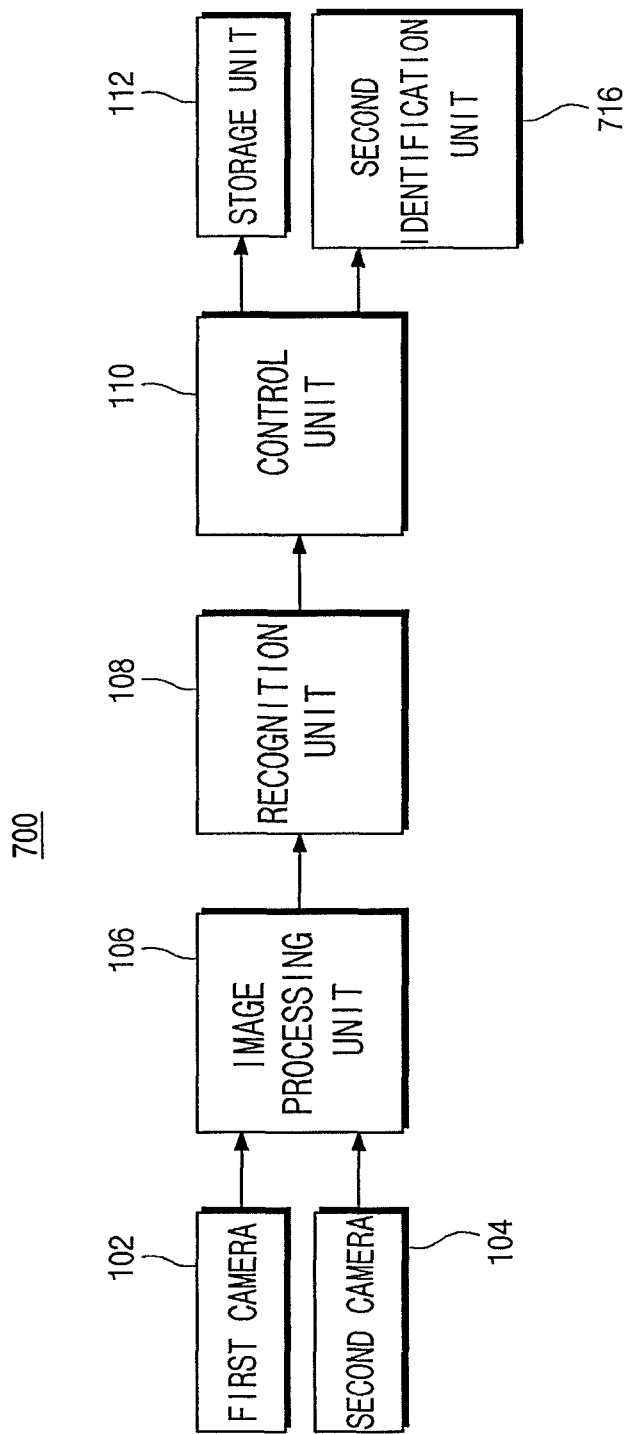
FIG. 7 is a block configuration diagram illustrating a vehicle safety control apparatus using cameras according to a third embodiment of the present invention.

FIG. 7 is a block configuration diagram illustrating a vehicle safety control apparatus using cameras according to a third embodiment of the present invention.

Referring to FIG. 7, like the vehicle safety control apparatus (100 in FIG. 1) using the cameras according to the first embodiment of the present invention, the vehicle safety control apparatus 700 using the cameras according to the third embodiment of the present invention includes a first camera 102, a second camera 104, an image processing unit 106, a recognition unit 108, a control unit 110, and a storage unit 112.

Functions and organic connection relations of elements of the vehicle safety control apparatus 700 using the cameras according to the third embodiment of the present invention are the same as those of the vehicle safety control apparatus (100 in FIG. 1) using the cameras according to the first embodiment of the present invention, and a detailed description thereof will thus be omitted.

Here, the vehicle safety control apparatus 700 using the cameras according to the third embodiment of the present invention further includes a second identification unit 716.

That is, the second identification unit 716 causes a state in which current object images are separately stored to be identified when the first and second current object image data matching the reference object-specific data are separately stored in the storage unit 112.

Here, although not illustrated, the second identification unit 716 may include at least one of an alarm (not illustrated), a speaker (not illustrated), and a light-emitting member (not illustrated) provided to allow a driver to identify information or a state of a vehicle, and at least one of an HMI module (not illustrated) and an HUD module (not illustrated) mounted to form an interface between a user and a machine to allow a driver to recognize information or a state of a vehicle, and, thus cause the state in which the current object images are separately stored to be identified through at least one of an alarm operation of the alarm (not illustrated), a voice operation of the speaker (not illustrated), a light emitting operation of the light emitting member (not illustrated), an HMI message display operation of the HMI module (not illustrated), and an HUD message display operation of the HUD module (not illustrated).

A vehicle safety control method for use in the vehicle safety control apparatus 700 using the camera according to the third embodiment of the present invention will be described with reference to FIGS. 8 and 9.

Figure 8:
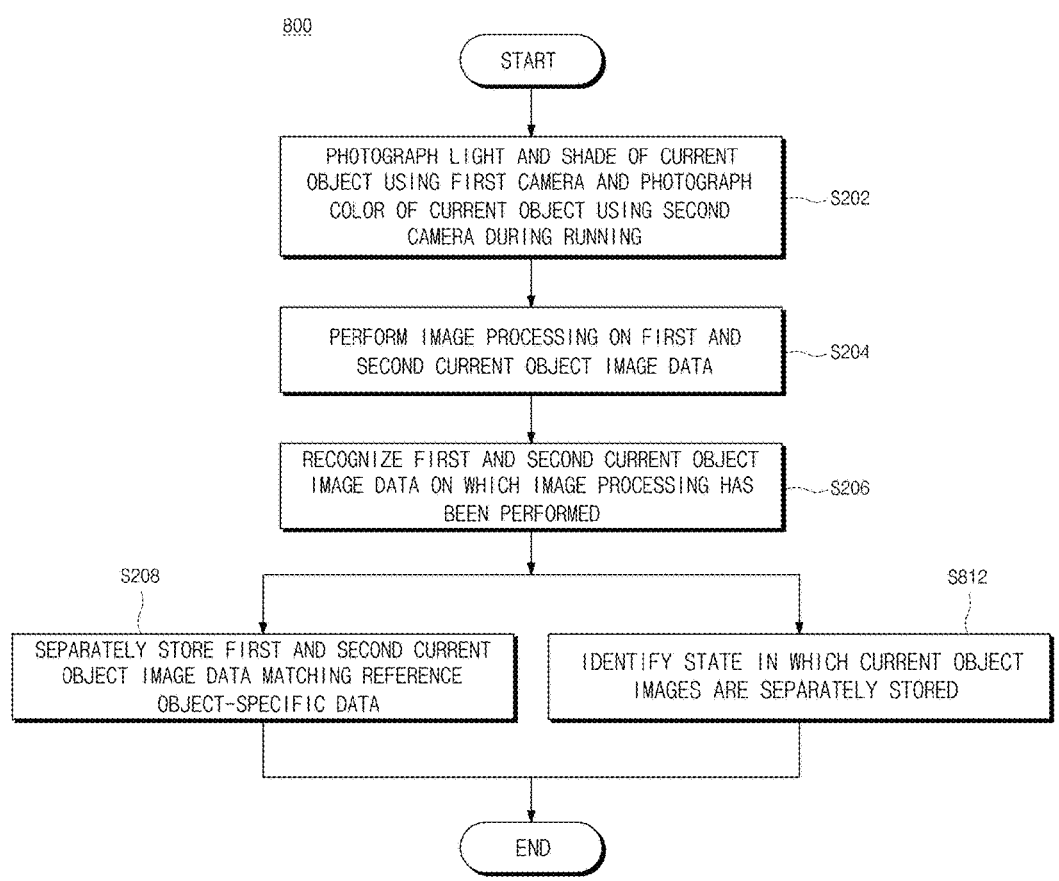
FIG. 8 is a flowchart illustrating a vehicle safety control method for use in the vehicle safety control apparatus using the cameras according to the third embodiment of the present invention.
Figure 9:
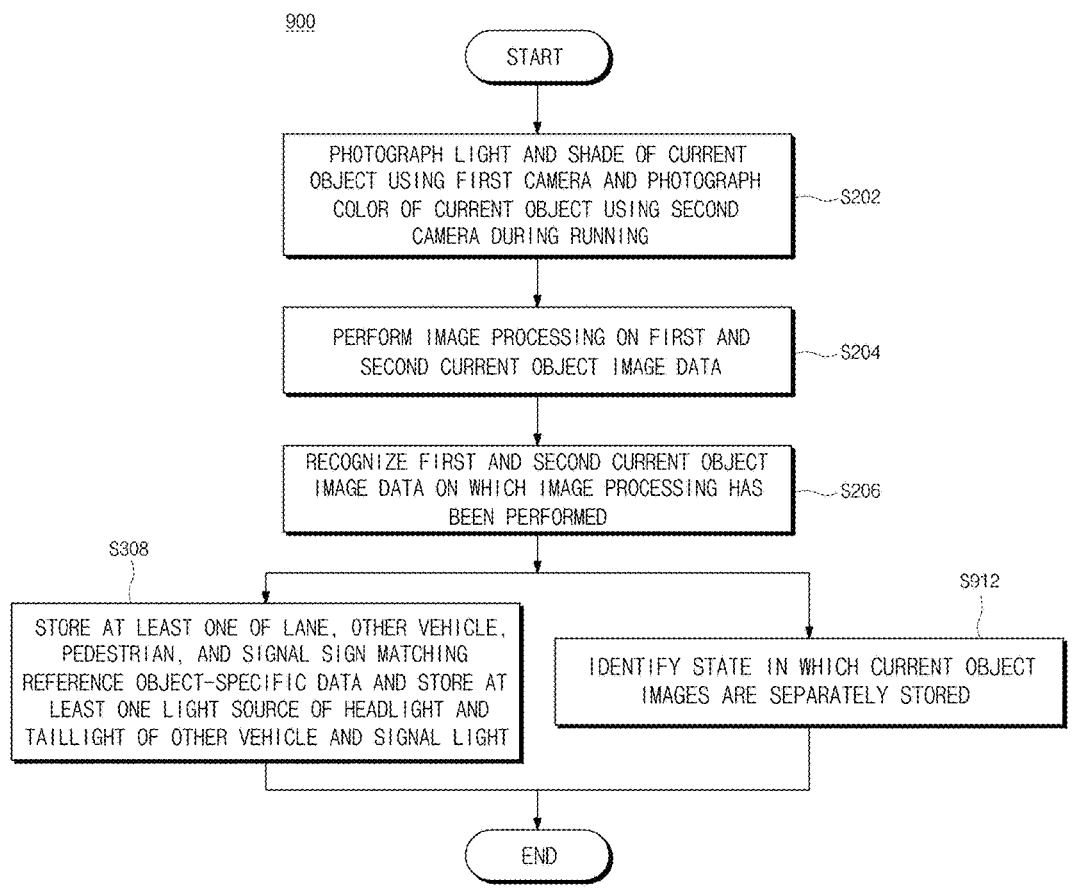
FIG. 9 is a flowchart illustrating an example of the vehicle safety control method for use in the vehicle safety control apparatus using the cameras according to the third embodiment of the present invention.

FIG. 8 is a flowchart illustrating the vehicle safety control method for use in the vehicle safety control apparatus using the cameras according to the third embodiment of the present invention, and FIG. 9 is a flowchart illustrating an example of the vehicle safety control method for use in the vehicle safety control apparatus using the cameras according to the third embodiment of the present invention.

Referring to FIGS. 8 and 9, like the vehicle safety control methods (200 and 300 in FIGS. 2 and 3) for use in the vehicle safety control apparatus (100 in FIG. 1) using the cameras according to the first embodiment of the present invention, vehicle safety control methods 800 and 900 for use in the vehicle safety control apparatus (700 in FIG. 7) using the cameras according to the third embodiment of the present invention include a photographing step S202, an image processing step S204, a recognition step S206, and storage steps S208 and S308.

Functions and organic connection relations of steps of the vehicle safety control methods 800 and 900 for use in the vehicle safety control apparatus (700 in FIG. 7) using the cameras according to the third embodiment of the present invention are the same as those of the vehicle safety control methods (200 and 300 in FIGS. 2 and 3) for use in the vehicle safety control apparatus (100 in FIG. 1) using the cameras according to the first embodiment of the present invention, and a detailed description thereof will thus be omitted.

Here, the vehicle safety control methods 800 and 900 for use in the vehicle safety control apparatus (700 in FIG. 7) using the cameras according to the third embodiment of the present invention further include second identification steps S812 and S912 to be performed in synchronization with the storage steps S208 and S308.

That is, in the second identification step S812, the second identification unit (716 of FIG. 7) causes a state in which current object images are separately stored to be identified when the first and second current object image data matching the reference object-specific data are separately stored in the storage unit (112 in FIG. 7).

As described above, in the vehicle safety control apparatus 700 using the cameras according to the third embodiment of the present invention including the first camera 102, the second camera 104, the image processing unit 106, the recognition unit 108, the control unit 110, the storage unit 112, and the second identification unit 716, the vehicle safety control methods 800 and 900 including the photographing step S202, the image processing step S204, the recognition step S206, the storage steps S208 and S308, and the second identification steps S812 and S912 are performed.

Accordingly, in the vehicle safety control apparatus 700 and the vehicle safety control methods 800 and 900 using the cameras according to the third embodiment of the present invention, the first camera 102 photographs a current object representing at least one of a lane, another vehicle, a pedestrian, and a signal sign by passing IR light using the bright lens for capturing a bright image, the second camera 104 photographs a current object representing at least one light source of a headlight and a taillight of the other vehicle and a signal light by blocking IR light using the dark lens for capturing a dark image, and the current object representing the at least one of the lane, the other vehicle, the pedestrian, and the signal sign photographed by the bright lens using the first camera 102 and the current object representing the at least one light source of the headlight and the taillight of the other vehicle and the signal light photographed by the dark lens using the second camera 104 may be separately stored in the storage unit 112.

In addition, in the vehicle safety control apparatus 700 and the vehicle safety control methods 800 and 900 using the cameras according to the third embodiment of the present invention, the second identification unit 716 may cause a state in which current object images are separately stored to be identified.

According to the vehicle safety control apparatus 700 and the vehicle safety control methods 800 and 900 using the cameras according to the third embodiment of the present invention, it is possible to induce a driver to carefully drive during running and further prevent a traffic accident from occurring in advance because the driver may recognize a state in which current object images are separately stored in the storage unit 112.

Figure 10:
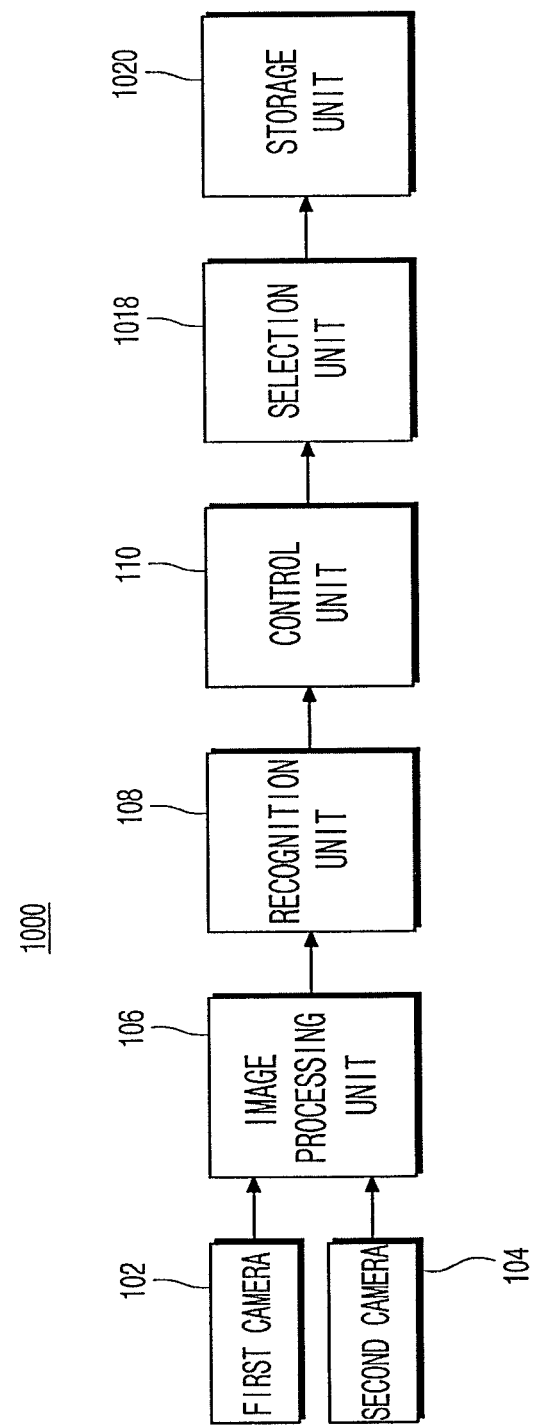
FIG. 10 is a block configuration diagram illustrating a vehicle safety control apparatus using cameras according to a fourth embodiment of the present invention.

FIG. 10 is a block configuration diagram illustrating a vehicle safety control apparatus using cameras according to a fourth embodiment of the present invention.

Referring to FIG. 10, like the vehicle safety control apparatus (100 in FIG. 1) using the cameras according to the first embodiment of the present invention, the vehicle safety control apparatus 1000 using the cameras according to the fourth embodiment of the present invention includes a first camera 102, a second camera 104, an image processing unit 106, a recognition unit 108, and a control unit 110.

Functions and organic connection relations of elements of the vehicle safety control apparatus 1000 using the cameras according to the fourth embodiment of the present invention are the same as those of the vehicle safety control apparatus (100 in FIG. 1) using the cameras according to the first embodiment of the present invention, and a detailed description thereof will thus be omitted.

Here, the vehicle safety control apparatus 1000 using the cameras according to the fourth embodiment of the present invention further includes a selection unit 1018 and a storage unit 1020.

That is, the selection unit 1018 selects a matching mode for causing the first and second current object image data recognized by the recognition unit 108 to match preset reference object-specific data.

Here, although not illustrated, the selection unit 1018 may include a selection button (not illustrated) provided inside the vehicle and configured to select the matching mode for matching the reference object-specific data.

In addition, the storage unit 1020 is provided to separately store the first and second current object image data matching the reference object-specific data in the selection unit 1018.

For example, the storage unit 1020 may store the first current object image data representing at least one of a distance from another vehicle and a lane interval matching the reference object-specific data and the second current object image data representing at least one light source of a headlight and a taillight of the other vehicle and a signal light matching the reference object-specific data.

Here, although not illustrated, the storage unit 1020 may include a normal memory (not illustrated). For example, the storage unit 1020 may be a normal SD memory card (not illustrated), and the present invention is not limited thereto. Any storage means for storing image data may be used.

Here, the control unit 110 receives the first and second current object image data recognized by the recognition unit 108 and delivers a selection command in the matching mode for causing the first and second current object image data recognized by the recognition unit 108 to match the reference object-specific data.

A vehicle safety control method for use in the vehicle safety control apparatus 1000 using the cameras according to the fourth embodiment of the present invention will be described with reference to FIGS. 11 and 12.

Figure 11:
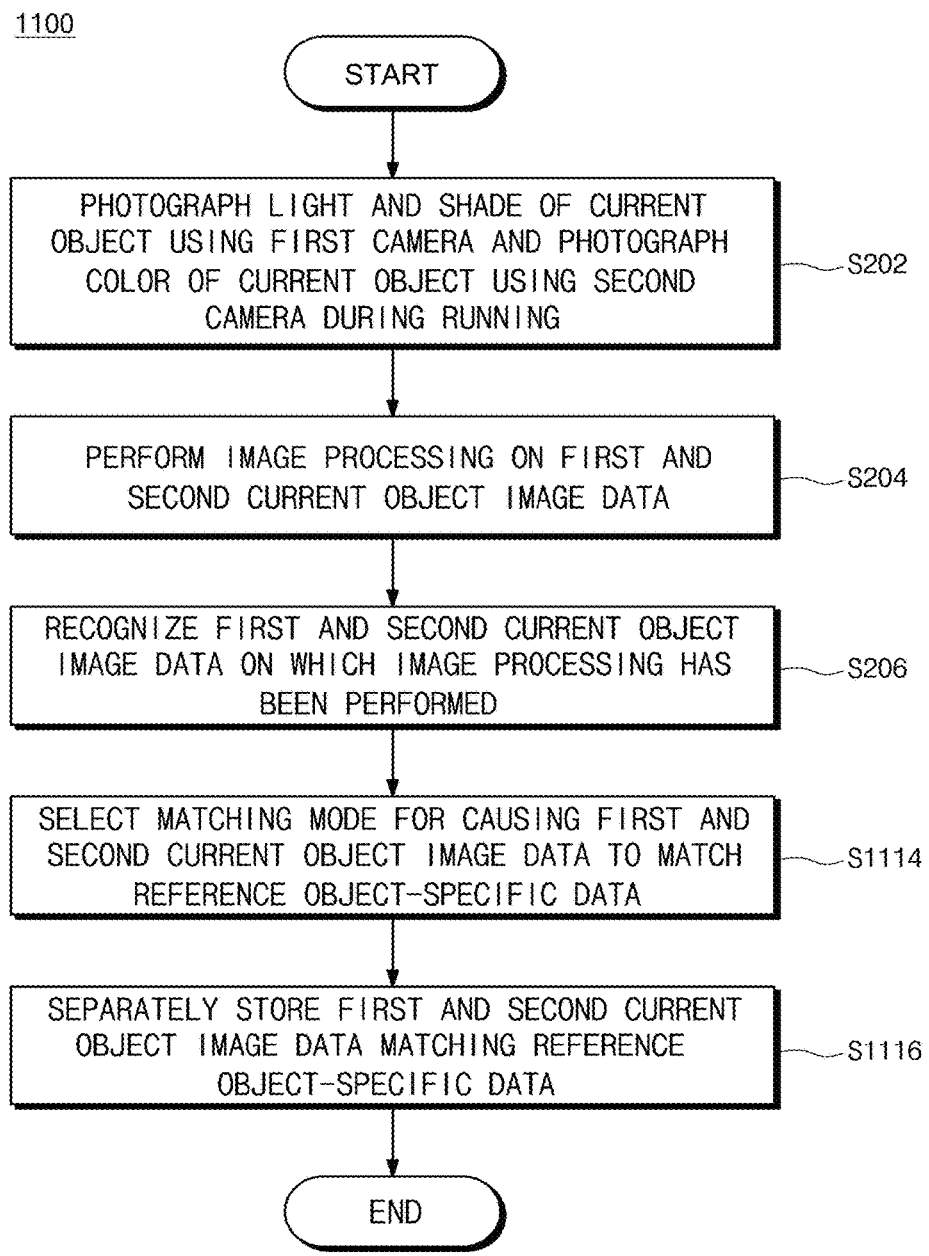
FIG. 11 is a flowchart illustrating a vehicle safety control method for use in the vehicle safety control apparatus using the cameras according to the fourth embodiment of the present invention.
Figure 12:
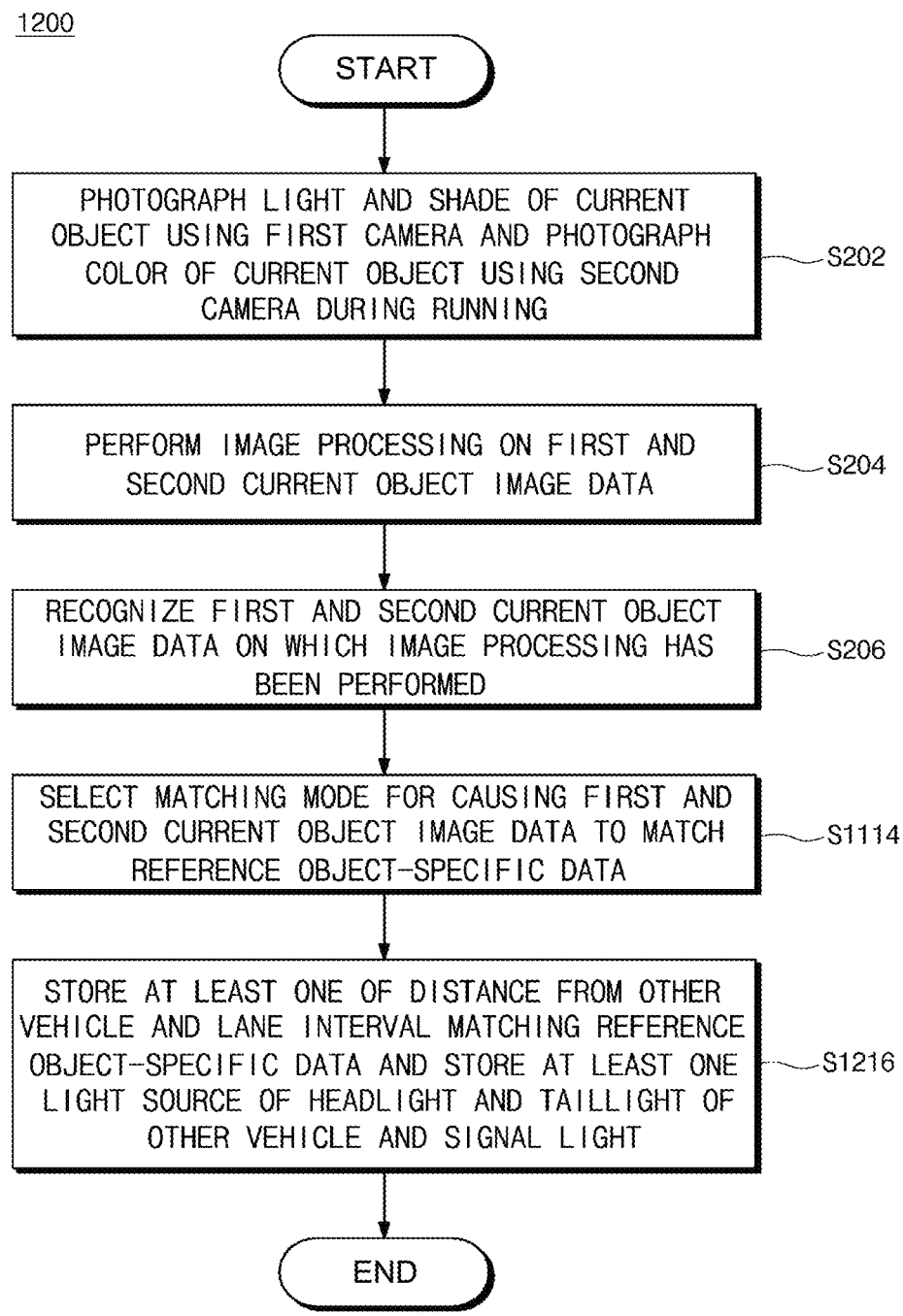
FIG. 12 is a flowchart illustrating an example of the vehicle safety control method for use in the vehicle safety control apparatus using the cameras according to the fourth embodiment of the present invention.

FIG. 11 is a flowchart illustrating the vehicle safety control method for use in the vehicle safety control apparatus using the cameras according to the fourth embodiment of the present invention, and FIG. 12 is a flowchart illustrating an example of the vehicle safety control method for use in the vehicle safety control apparatus using the cameras according to the fourth embodiment of the present invention.

Referring to FIGS. 11 and 12, like the vehicle safety control methods (200 and 300 in FIGS. 2 and 3) for use in the vehicle safety control apparatus (100 in FIG. 1) using the cameras according to the first embodiment of the present invention, vehicle safety control methods 1100 and 1200 for use in the vehicle safety control apparatus (1000 in FIG. 10) using the cameras according to the fourth embodiment of the present invention include a photographing step S202, an image processing step S204, and a recognition step S206.

Functions and organic connection relations of steps of the vehicle safety control methods 1100 and 1200 for use in the vehicle safety control apparatus (1000 in FIG. 10) using the cameras according to the fourth embodiment of the present invention are the same as those of the vehicle safety control methods (200 and 300 in FIGS. 2 and 3) for use in the vehicle safety control apparatus (100 in FIG. 1) using the cameras according to the first embodiment of the present invention, and a detailed description thereof will thus be omitted.

Here, the vehicle safety control methods 1100 and 1200 for use in the vehicle safety control apparatus (1000 in FIG. 10) using the cameras according to the fourth embodiment of the present invention further include a selection step S1114 and storage steps S1116 and S1216 after the recognition step S206.

That is, in the selection step S1114, the selection unit (1018 in FIG. 10) selects a matching mode for causing the first and second current object image data recognized by the recognition unit (108 in FIG. 10) to match preset reference object-specific data.

Thereafter, in the storage step S1116, the storage unit (1020 in FIG. 10) separately stores the first and second current object image data matching the reference object-specific data in the selection unit (1018 in FIG. 10).

For example, as illustrated in FIG. 12, in the storage step S1216, the first current object image data representing at least one of a distance from another vehicle and a lane interval matching the reference object-specific data may be stored and the second current object image data representing at least one light source of a headlight and a taillight of the other vehicle and a signal light matching the reference object-specific data may be stored.

As described above, in the vehicle safety control apparatus 1000 using the cameras according to the fourth embodiment of the present invention including the first camera 102, the second camera 104, the image processing unit 106, the recognition unit 108, the control unit 110, the selection unit 1018, and the storage unit 1020, the vehicle safety control methods 1100 and 1200 including the photographing step S202, the image processing step S204, the recognition step S206, the selection step S1114, and the storage steps S1116 and S1216 are performed.

Accordingly, in the vehicle safety control apparatus 1000 and the vehicle safety control methods 1100 and 1200 using the cameras according to the fourth embodiment of the present invention, the first camera 102 photographs a current object representing at least one of a lane, another vehicle, a pedestrian, and a signal sign by passing IR light using the bright lens for capturing a bright image, the second camera 104 photographs a current object representing at least one light source of a headlight and a taillight of the other vehicle and a signal light by blocking IR light using the dark lens for capturing a dark image, and the current object representing the at least one of the lane, the other vehicle, the pedestrian, and the signal sign photographed by the bright lens using the first camera 102 and the current object representing the at least one light source of the headlight and the taillight of the other vehicle and the signal light photographed by the dark lens using the second camera 104 may be separately stored in the storage unit 1020.

According to the vehicle safety control apparatus 1000 and the vehicle safety control methods 1100 and 1200 using the cameras according to the fourth embodiment of the present invention, it is possible to prevent a traffic accident from occurring in advance while providing convenience of driving for a driver because an image recognition rate may be efficiently increased for a current object during running.

Figure 13:
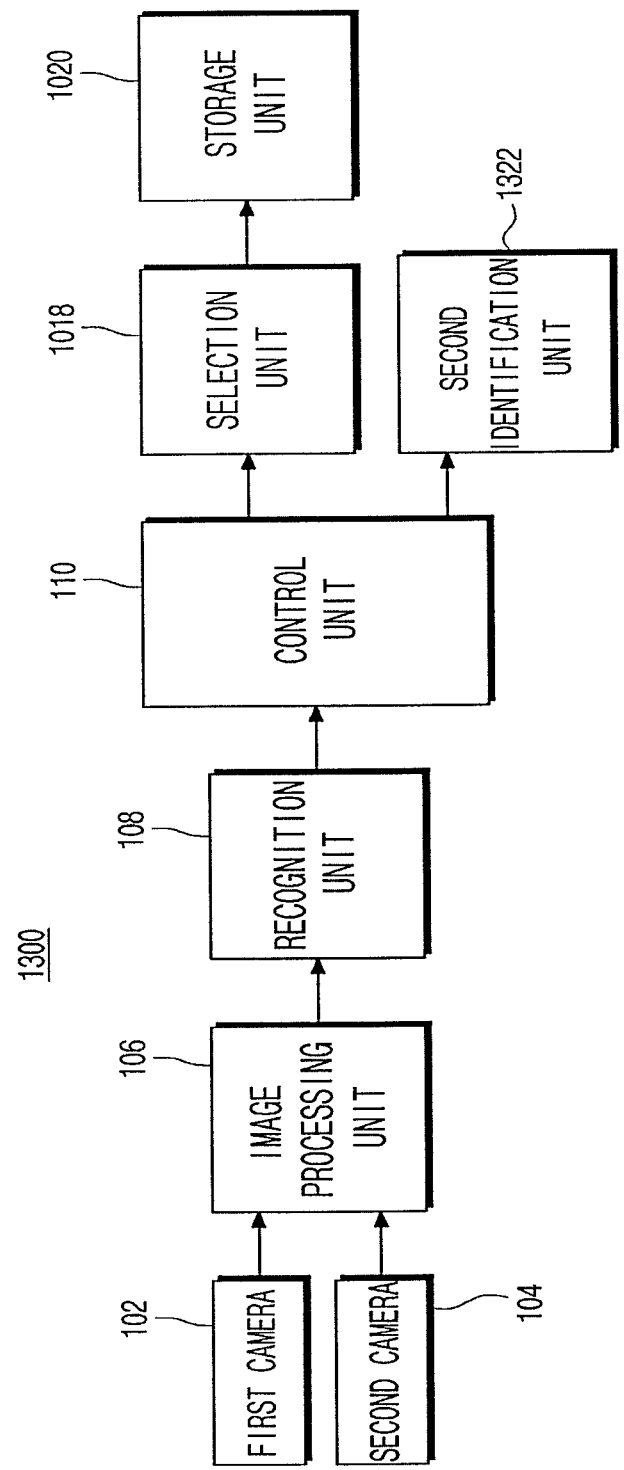
FIG. 13 is a block configuration diagram illustrating a vehicle safety control apparatus using cameras according to a fifth embodiment of the present invention.

FIG. 13 is a block configuration diagram illustrating a vehicle safety control apparatus using cameras according to a fifth embodiment of the present invention.

Referring to FIG. 13, like the vehicle safety control apparatus (1000 in FIG. 10) using the cameras according to the fourth embodiment of the present invention, the vehicle safety control apparatus 1300 using the cameras according to the fifth embodiment of the present invention includes a first camera 102, a second camera 104, an image processing unit 106, a recognition unit 108, a control unit 110, a selection unit 1018, and a storage unit 1020.

Functions and organic connection relations of elements of the vehicle safety control apparatus 1300 using the cameras according to the fifth embodiment of the present invention are the same as those of the vehicle safety control apparatus (1000 in FIG. 10) using the cameras according to the fourth embodiment of the present invention, and a detailed description thereof will thus be omitted.

Here, the vehicle safety control apparatus 1300 using the cameras according to the fifth embodiment of the present invention further includes a second identification unit 1322.

That is, the second identification unit 1322 causes a state in which current object images are separately stored to be identified when the first and second current object image data matching the reference object-specific data are separately stored in the storage unit 1020.

Here, although not illustrated, the second identification unit 1322 may include at least one of an alarm (not illustrated), a speaker (not illustrated), and a light-emitting member (not illustrated) provided to allow a driver to identify information or a state of a vehicle, and at least one of an HMI module (not illustrated) and an HUD module (not illustrated) mounted to form an interface between a user and a machine to allow a driver to recognize information or a state of a vehicle, and, thus cause the state in which the current object images are separately stored to be identified through at least one of an alarm operation of the alarm (not illustrated), a voice operation of the speaker (not illustrated), a light emitting operation of the light emitting member (not illustrated), an HMI message display operation of the HMI module (not illustrated), and an HUD message display operation of the HUD module (not illustrated).

A vehicle safety control method for use in the vehicle safety control apparatus 1300 using the cameras according to the fifth embodiment of the present invention will be described with reference to FIGS. 14 and 15.

Figure 14:
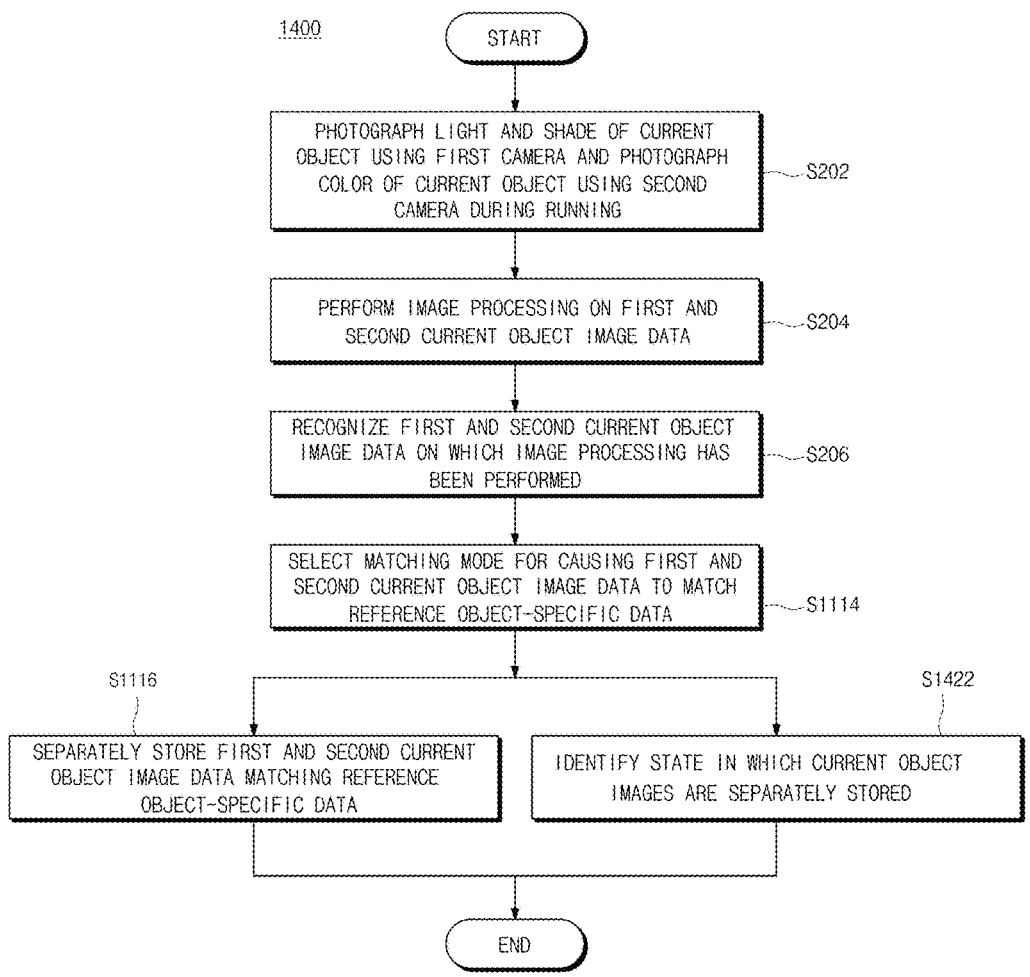
FIG. 14 is a flowchart illustrating a vehicle safety control method for use in the vehicle safety control apparatus using the cameras according to the fifth embodiment of the present invention.
Figure 15:
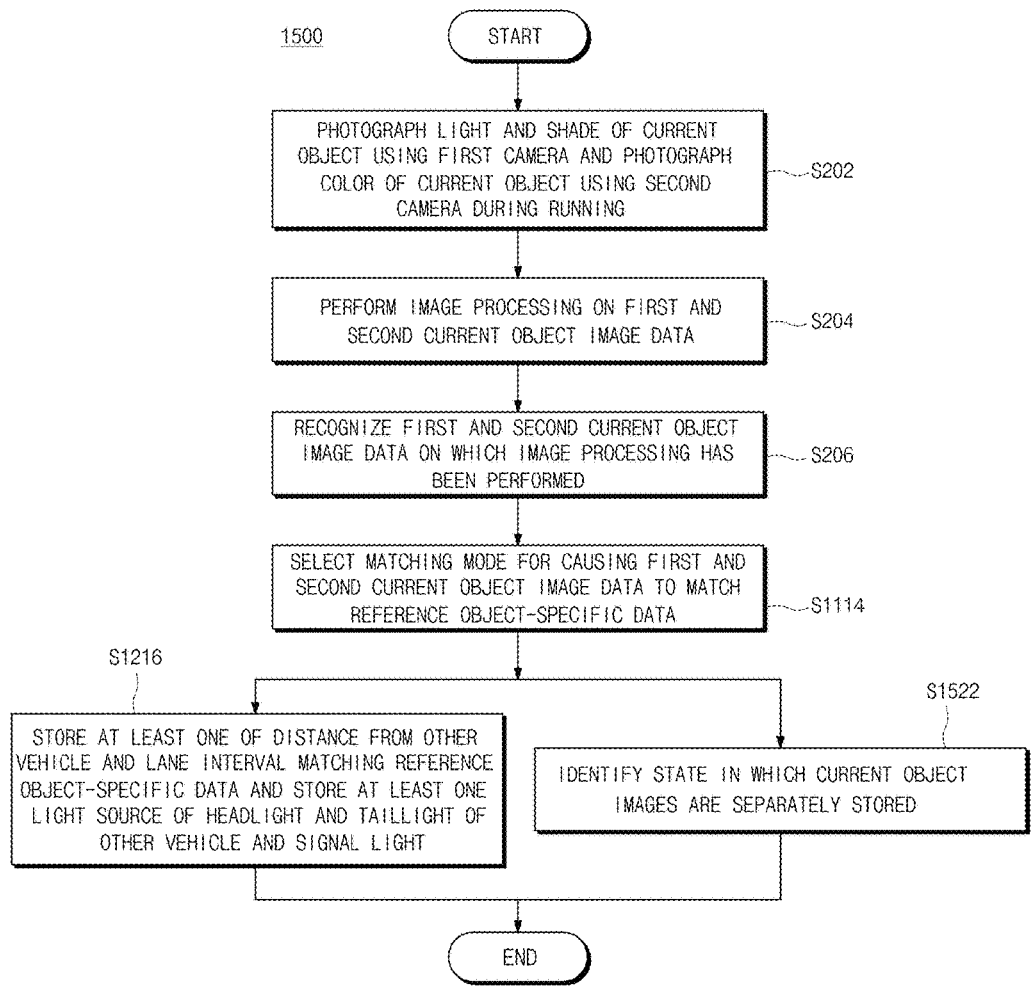
FIG. 15 is a flowchart illustrating an example of the vehicle safety control method for use in the vehicle safety control apparatus using the cameras according to the fifth embodiment of the present invention.

FIG. 14 is a flowchart illustrating the vehicle safety control method for use in the vehicle safety control apparatus using the cameras according to the fifth embodiment of the present invention, and FIG. 15 is a flowchart illustrating an example of the vehicle safety control method for use in the vehicle safety control apparatus using the cameras according to the fifth embodiment of the present invention.

Referring to FIGS. 14 and 15, like the vehicle safety control methods (1100 and 1200 in FIGS. 11 and 12) for use in the vehicle safety control apparatus (1000 in FIG. 10) using the cameras according to the fourth embodiment of the present invention, vehicle safety control methods 1400 and 1500 for use in the vehicle safety control apparatus (1300 in FIG. 13) using the cameras according to the fifth embodiment of the present invention include a photographing step S202, an image processing step S204, a recognition step S206, a selection step S1114, and storage steps S1116 and S1216.

Functions and organic connection relations of steps of the vehicle safety control methods 1400 and 1500 for use in the vehicle safety control apparatus (1300 in FIG. 13) using the cameras according to the fifth embodiment of the present invention are the same as those of the vehicle safety control methods (1100 and 1200 in FIGS. 11 and 12) for use in the vehicle safety control apparatus (1000 in FIG. 10) using the cameras according to the fourth embodiment of the present invention, and a detailed description thereof will thus be omitted.

Here, the vehicle safety control methods 1400 and 1500 for use in the vehicle safety control apparatus (1300 in FIG. 13) using the cameras according to the fifth embodiment of the present invention further include second identification steps S1422 and S1522 to be performed in synchronization with the storage steps S1116 and S1216.

That is, in the second identification step S1422, the second identification unit (1322 of FIG. 13) causes a state in which current object images are separately stored to be identified when the first and second current object image data matching the reference object-specific data are separately stored in the storage unit (1020 in FIG. 13).

As described above, in the vehicle safety control apparatus 1300 using the cameras according to the fifth embodiment of the present invention including the first camera 102, the second camera 104, the image processing unit 106, the recognition unit 108, the control unit 110, the selection unit 1018, the storage unit 1020, and the second identification unit 1322, the vehicle safety control methods 1400 and 1500 including the photographing step S202, the image processing step S204, the recognition step S206, the selection step S1114, the storage steps S1116 and S1216, and the second identification steps S1422 and S1522 are performed.

Accordingly, in the vehicle safety control apparatus 1300 and the vehicle safety control methods 1400 and 1500 using the cameras according to the fifth embodiment of the present invention, the first camera 102 photographs a current object representing at least one of a lane, another vehicle, a pedestrian, and a signal sign by passing IR light using the bright lens for capturing a bright image, the second camera 104 photographs a current object representing at least one light source of a headlight and a taillight of the other vehicle and a signal light by blocking IR light using the dark lens for capturing a dark image, and the current object representing the at least one of the lane, the other vehicle, the pedestrian, and the signal sign photographed by the bright lens using the first camera 102 and the current object representing the at least one light source of the headlight and the taillight of the other vehicle and the signal light photographed by the dark lens using the second camera 104 may be separately stored in the storage unit 1020.

According to the vehicle safety control apparatus 1300 and the vehicle safety control methods 1400 and 1500 using the cameras according to the fifth embodiment of the present invention, it is possible to prevent a traffic accident from occurring in advance while providing convenience of driving for a driver because an image recognition rate may be efficiently increased for a current object during running.

Further, in the vehicle safety control apparatus 1300 and the vehicle safety control methods 1400 and 1500 using the cameras according to the fifth embodiment of the present invention, the second identification unit 1322 may cause a state in which current object images are separately stored to be identified.

According to the vehicle safety control apparatus 1300 and the vehicle safety control methods 1400 and 1500 using the cameras according to the fifth embodiment of the present invention, it is possible to induce a driver to carefully drive during running and further prevent a traffic accident from occurring in advance because the driver may recognize a state in which current object images are separately stored in the storage unit 1020.

Figure 16:
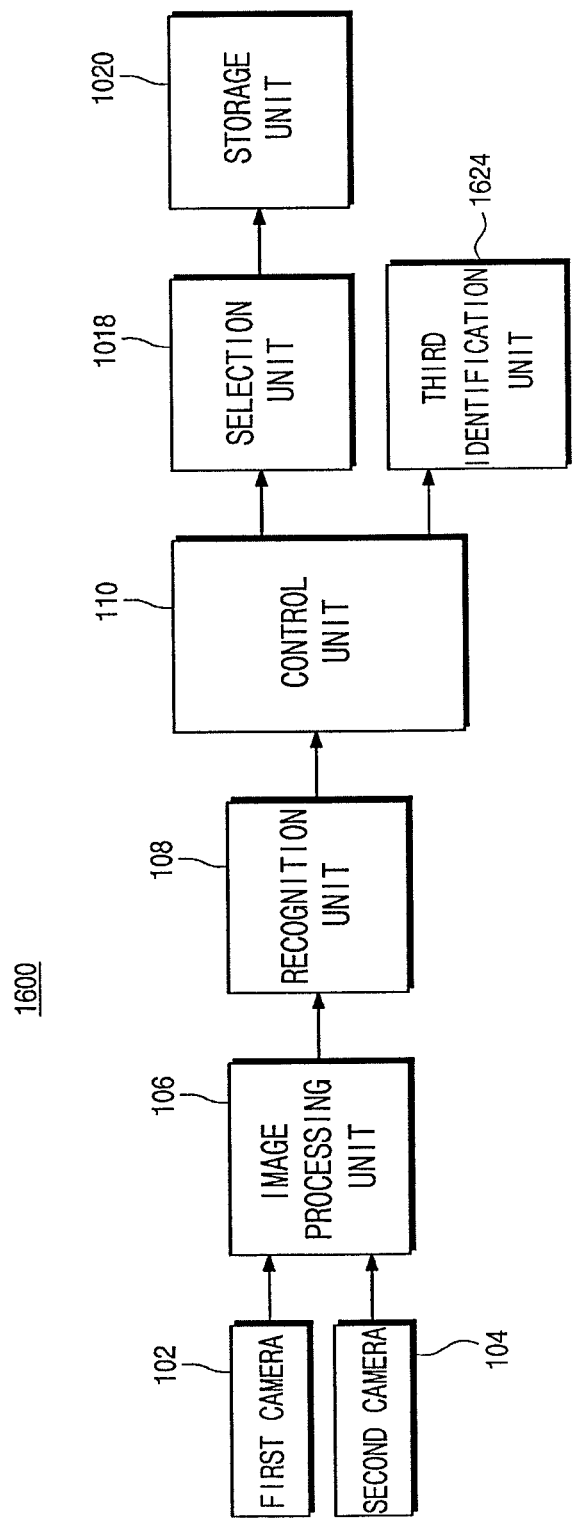
FIG. 16 is a block configuration diagram illustrating a vehicle safety control apparatus using cameras according to a sixth embodiment of the present invention.

FIG. 16 is a block configuration diagram illustrating a vehicle safety control apparatus using cameras according to a sixth embodiment of the present invention.

Referring to FIG. 16, like the vehicle safety control apparatus (1000 in FIG. 10) using the cameras according to the fourth embodiment of the present invention, the vehicle safety control apparatus 1600 using the cameras according to the sixth embodiment of the present invention includes a first camera 102, a second camera 104, an image processing unit 106, a recognition unit 108, a control unit 110, a selection unit 1018, and a storage unit 1020.

Functions and organic connection relations of elements of the vehicle safety control apparatus 1600 using the cameras according to the sixth embodiment of the present invention are the same as those of the vehicle safety control apparatus (1000 in FIG. 10) using the cameras according to the fourth embodiment of the present invention, and a detailed description thereof will thus be omitted.

Here, the vehicle safety control apparatus 1600 using the cameras according to the sixth embodiment of the present invention further includes a third identification unit 1624.

That is, the third identification unit 1624 causes a current matching state for the reference object-specific data to be identified when the first and second current object image data are caused to match the reference object-specific data in the selection unit 1018 according to control of the control unit 110.

Here, although not illustrated, the third identification unit 1624 may include at least one of an alarm (not illustrated), a speaker (not illustrated), and a light-emitting member (not illustrated) provided to allow a driver to identify information or a state of a vehicle, and at least one of an HMI module (not illustrated) and an HUD module (not illustrated) mounted to form an interface between a user and a machine to allow a driver to recognize information or a state of a vehicle, and, thus cause the current matching state for the reference object-specific data to be identified through at least one of an alarm operation of the alarm (not illustrated), a voice operation of the speaker (not illustrated), a light emitting operation of the light emitting member (not illustrated), an HMI message display operation of the HMI module (not illustrated), and an HUD message display operation of the HUD module (not illustrated).

A vehicle safety control method for use in the vehicle safety control apparatus 1600 using the cameras according to the sixth embodiment of the present invention will be described with reference to FIGS. 17 and 18.

Figure 17:
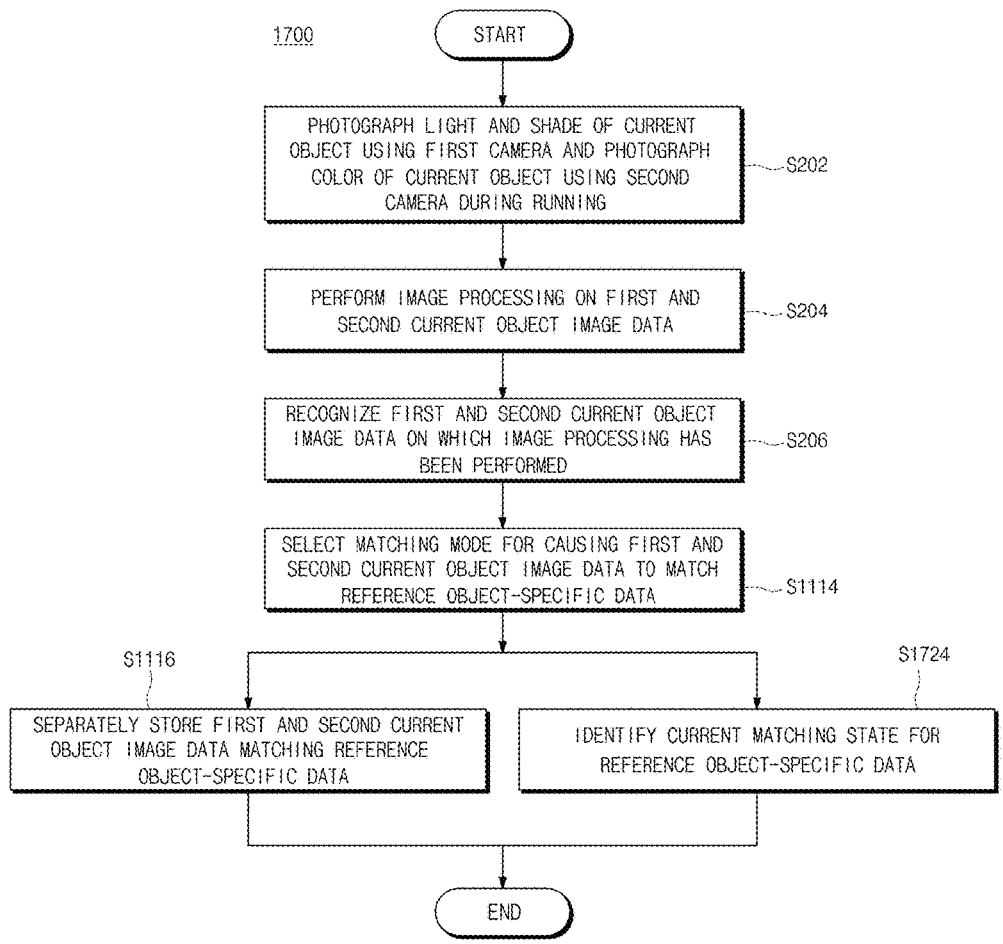
FIG. 17 is a flowchart illustrating a vehicle safety control method for use in the vehicle safety control apparatus using the cameras according to the sixth embodiment of the present invention.
Figure 18:
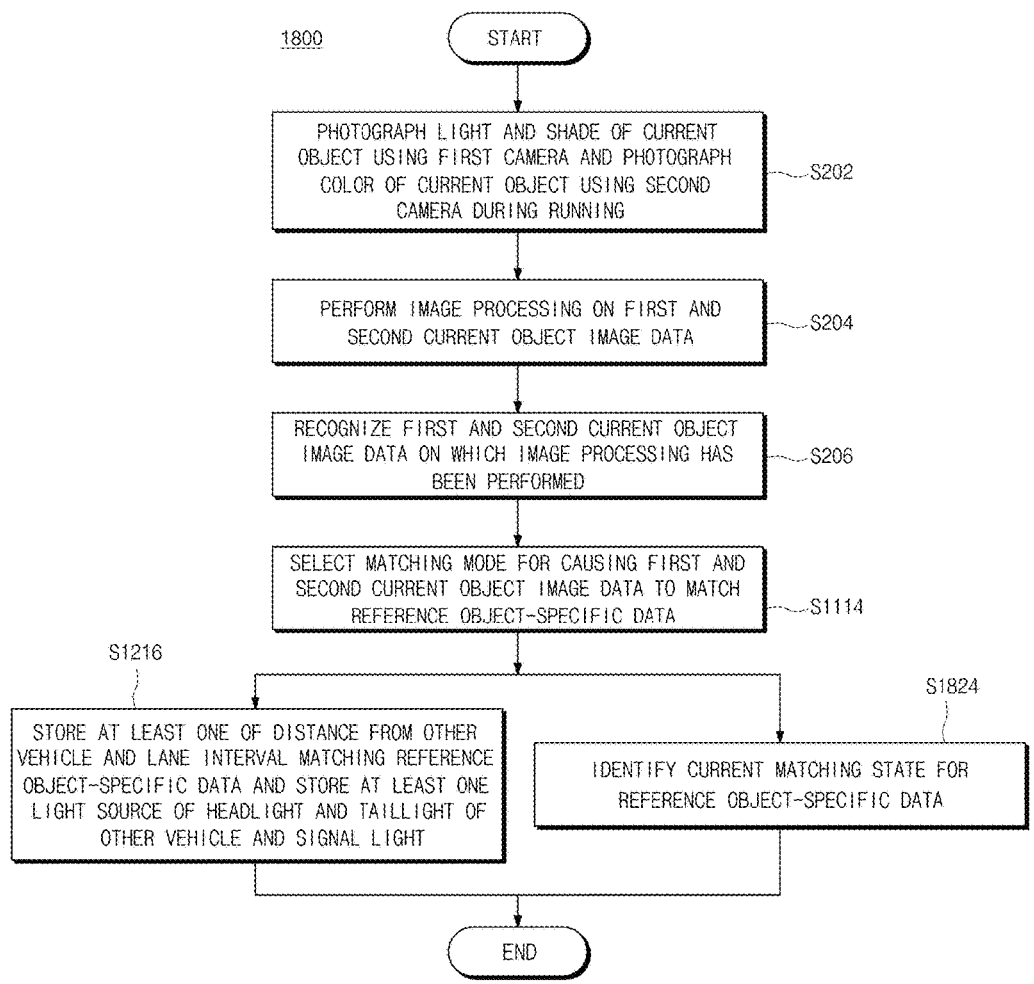
FIG. 18 is a flowchart illustrating an example of the vehicle safety control method for use in the vehicle safety control apparatus using the cameras according to the sixth embodiment of the present invention.

FIG. 17 is a flowchart illustrating the vehicle safety control method for use in the vehicle safety control apparatus using the cameras according to the sixth embodiment of the present invention, and FIG. 18 is a flowchart illustrating an example of the vehicle safety control method for use in the vehicle safety control apparatus using the cameras according to the sixth embodiment of the present invention.

Referring to FIGS. 17 and 18, like the vehicle safety control methods (1100 and 1200 in FIGS. 11 and 12) for use in the vehicle safety control apparatus (1000 in FIG. 10) using the cameras according to the fourth embodiment of the present invention, vehicle safety control methods 1700 and 1800 for use in the vehicle safety control apparatus (1600 in FIG. 16) using the cameras according to the sixth embodiment of the present invention include a photographing step S202, an image processing step S204, a recognition step S206, a selection step S1114, and storage steps S1116 and S1216.

Functions and organic connection relations of steps of the vehicle safety control methods 1700 and 1800 for use in the vehicle safety control apparatus (1600 in FIG. 16) using the cameras according to the sixth embodiment of the present invention are the same as those of the vehicle safety control methods (1100 and 1200 in FIGS. 11 and 12) for use in the vehicle safety control apparatus (1000 in FIG. 10) using the cameras according to the fourth embodiment of the present invention, and a detailed description thereof will thus be omitted.

Here, the vehicle safety control methods 1700 and 1800 for use in the vehicle safety control apparatus (1600 in FIG. 16) using the cameras according to the sixth embodiment of the present invention further include third identification steps S1724 and S1824 to be performed in synchronization with the storage steps S1116 and S1216.

That is, in the third identification step S1724, the third identification unit (1624 of FIG. 16) causes the current matching state for the reference object-specific data to be identified when the first and second current object image data are caused to match the reference object-specific data according to control of the control unit (110 of FIG. 16) in the selection unit (1018 in FIG. 16).

As described above, in the vehicle safety control apparatus 1600 using the cameras according to the sixth embodiment of the present invention including the first camera 102, the second camera 104, the image processing unit 106, the recognition unit 108, the control unit 110, the selection unit 1018, the storage unit 1020, and the third identification unit 1624, the vehicle safety control methods 1700 and 1800 including the photographing step S202, the image processing step S204, the recognition step S206, the selection step S1114, the storage steps S1116 and S1216, and the third identification steps S1724 and S1824 are performed.

Accordingly, in the vehicle safety control apparatus 1600 and the vehicle safety control methods 1700 and 1800 using the cameras according to the sixth embodiment of the present invention, the first camera 102 photographs a current object representing at least one of a lane, another vehicle, a pedestrian, and a signal sign by passing IR light using the bright lens for capturing a bright image, the second camera 104 photographs a current object representing at least one light source of a headlight and a taillight of the other vehicle and a signal light by blocking IR light using the dark lens for capturing a dark image, and the current object representing the at least one of the lane, the other vehicle, the pedestrian, and the signal sign photographed by the bright lens using the first camera 102 and the current object representing the at least one light source of the headlight and the taillight of the other vehicle and the signal light photographed by the dark lens using the second camera 104 may be separately stored in the storage unit 1020.

According to the vehicle safety control apparatus 1600 and the vehicle safety control methods 1700 and 1800 using the cameras according to the sixth embodiment of the present invention, it is possible to prevent a traffic accident from occurring in advance while providing convenience of driving for a driver because an image recognition rate may be efficiently increased for a current object during running.

Further, in the vehicle safety control apparatus 1600 and the vehicle safety control methods 1700 and 1800 using the cameras according to the sixth embodiment of the present invention, the third identification unit 1624 may cause a current matching state for the reference object-specific data to be identified.

According to the vehicle safety control apparatus 1600 and the vehicle safety control methods 1700 and 1800 using the cameras according to the sixth embodiment of the present invention, it is possible to induce a driver to carefully drive during running and further prevent a traffic accident from occurring in advance because the driver may recognize a state in which the current object currently matches the reference object-specific data in the storage unit 1020.

As is apparent from the above description, an vehicle safety control apparatus and method using cameras according to the embodiment of the present invention have the following effects.

First, there is an advantage in that it is possible to prevent a traffic accident from occurring in advance while providing convenience of driving for a driver because an image recognition rate may be efficiently increased for a current object during running.

Second, there is an advantage in that it is possible to further prevent a traffic accident from occurring in advance because it is possible to induce the driver to carefully drive during running.

Although exemplary embodiments of the present invention have been described for illustrative purposes, those skilled in the art will appreciate that various modifications, additions, and substitutions are possible, without departing from the scope and spirit of the invention as disclosed in the accompanying claims. Therefore, the exemplary embodiments described above should be understood as illustrative not restrictive in all aspects. The present invention is defined only by the scope of the appended claims and must be construed as including the meaning and scope of the claims, and all changes and modifications derived from equivalent concepts of the claims.

What is claimed is:

1. A vehicle safety control apparatus using cameras, comprising:
   a first camera configured to photograph light and shade of a current object;
   a second camera configured to photograph a color of the current object;
   an image processor performing image processing on first current object image data captured by the first camera and second current object image data captured by the second camera;
   a recognizer recognizing another vehicle, a pedestrian, and a signal sign from the first current object image data of the first camera photographing the light and shade of the current object, and recognizing a light source from the second current object image data of the second camera photographing the color of the current object;
   a storage causing the first and second current object image data recognized by the recognizer to match preset reference object-specific data and separately storing the first current object image data representing at least one of the another vehicle, the pedestrian, and the signal sign and the second current object image data representing the light source, the first and second current object image data matching the reference object-specific data;
   a controller receiving the first and second current object image data recognized by the recognizer and outputting a storage command to the storage so that the first and second current object image data matching the reference object-specific data are separately stored; and
   a first identifier informing a state in which current object images are separately stored when the first and second current object image data matching the reference object-specific data are separately stored in the storage.

2. The vehicle safety control apparatus using the cameras according to claim 1, wherein the first camera includes a bright lens configured to capture a bright image by passing infrared (IR) light.

3. The vehicle safety control apparatus using the cameras according to claim 1, wherein the second camera includes a dark lens configured to capture a dark image by blocking IR light.

4. The vehicle safety control apparatus using the cameras according to claim 1, wherein the light source is at least one of a headlight and a taillight of another vehicle and a signal light.

5. The vehicle safety control apparatus using the cameras according to claim 1, further comprising:
a second identifier causing a current matching state for the reference object-specific data to be identified when the first and second current object image data are caused to match the reference object-specific data in the storage according to control of the control unit.

6. The apparatus of claim 1, wherein the first identifier informs the state in which the current object images are separately stored, by using at least one of a light emitting operation of a light-emitting member, an HMI (Human Machine Interface) message display operation of an HMI module and an HUD (Head-Up Display) message display operation of a HUD Module, when the first and second current object image data matching the reference object-specific data are separately stored in the storage.

7. A vehicle safety control apparatus using cameras, comprising:
a first camera configured to photograph light and shade of a current object;
a second camera configured to photograph a color of the current object;
an image processor performing image processing on first current object image data captured by the first camera and second current object image data captured by the second camera;
a recognizer recognizing another vehicle, a pedestrian, and a signal sign from the first current object image data of the first camera photographing the light and shade of the current object, and recognizing a light source from the second current object image data of the second camera photographing the color of the current object;
a selection unit configured to select a matching mode for causing the first and second current object image data recognized by the recognizer to match preset reference object-specific data;
a storage separately storing the first current object image data representing at least one of the another vehicle, the pedestrian, and the signal sign and the second current object image data representing the light source, the first and second current object image data matching the preset reference object-specific data in the selection unit;
a controller receiving the first and second current object image data recognized by the recognizer and outputting a selection command in the matching mode for causing the first and second current object image data recognized by the recognizer to match the reference object-specific data; and
a first identifier informing a state in which current object images are separately stored when the first and second current object image data matching the reference object-specific data are separately stored in the storage.

8. The vehicle safety control apparatus using the cameras according to claim 7, wherein the first camera includes a bright lens configured to capture a bright image by passing IR light.

9. The vehicle safety control apparatus using the cameras according to claim 7, wherein the second camera includes a dark lens configured to capture a dark image by blocking IR light.

10. The vehicle safety control apparatus using the cameras according to claim 7, wherein the light source is at least one of a headlight and a taillight of another vehicle and a signal light.

11. The vehicle safety control apparatus using the cameras according to claim 7, further comprising:
a third identifier causing a current matching state for the reference object-specific data to be identified when the first and second current object image data are caused to match the reference object-specific data in the selection unit according to control of the control unit.

12. The apparatus of claim 7, wherein the first identifier informs the state in which the current object images are separately stored, by using at least one of a light emitting operation of a light-emitting member, an HMI (Human Machine Interface) message display operation of an HMI module and an HUD (Head-Up Display) message display operation of a HUD Module, when the first and second current object image data matching the reference object-specific data are separately stored in the storage.

13. A vehicle safety control method using cameras, comprising:
photographing, by a first camera, light and shade of a current object and photographing, by a second camera, a color of the current object during running;
performing, by an image processing unit, image processing on first current object image data captured by the first camera and second current object image data captured by the second camera;
recognizing, by a recognition unit, another vehicle, a pedestrian, and a signal sign from the first current object image data of the first camera photographing the light and shade of the current object, and recognizing a light source from the second current object image data of the second camera photographing the color of the current object; and
causing, by a storage unit, the first and second current object image data recognized by the recognition unit to match preset reference object-specific data and separately storing, by the storage unit, the first current object image data representing at least one of the another vehicle, the pedestrian, and the signal sign and the second current object image data representing the light source, the first and second current object image data matching the reference object-specific data; and
informing, by a first identification unit, a state in which current object images are separately stored to be identified when the first and second current object image data matching the reference object-specific data are separately stored in the storage unit.

14. The vehicle safety control method using the cameras according to claim 13, further comprising:
causing, by a second identification unit, a current matching state for the reference object-specific data to be identified when the first and second current object image data are caused to match the reference object-specific data in the storage unit according to control of a control unit.

15. The method of claim 13, wherein the state in which the current object images are separately stored, is informed by using at least one of a light emitting operation of a light-emitting member, an HMI (Human Machine Interface) message display operation of an HMI module and an HUD (Head-Up Display) message display operation of a HUD Module, when the first and second current object image data matching the reference object-specific data are separately stored in the storage.

16. A vehicle safety control method using cameras, comprising:

photographing, by a first camera, light and shade of a current object and photographing, by a second camera, a color of the current object during running;

performing, by an image processing unit, image processing on first current object image data captured by the first camera and second current object image data captured by the second camera;

recognizing, by a recognition unit, another vehicle, a pedestrian, and a signal sign from the first current object image data of the first camera photographing the light and shade of the current object, and recognizing a light source from the second current object image data of the second camera photographing the color of the current object;

selecting, by a selection unit, a matching mode for causing the first and second current object image data recognized by the recognition unit to match preset reference object-specific data;

separately storing, by a storage unit, the first current object image data representing at least one of the another vehicle, the pedestrian, and the signal sign and the second current object image data representing the light source, the first and second current object image data matching the preset reference object-specific data in the selection unit; and informing, by a first identification unit, a state in which current object images are separately stored to be identified when the first and second current object image data matching the reference object-specific data are separately stored in the storage unit.

17. The vehicle safety control method using the cameras according to claim 16, further comprising:

causing, by a third identification unit, a current matching state for the reference object-specific data to be identified when the first and second current object image data are caused to match the reference object-specific data in the selection unit according to control of the control unit.

18. The method of claim 16, wherein the state in which the current object images are separately stored, is informed by using at least one of a light emitting operation of a light-emitting member, an HMI (Human Machine Interface) message display operation of an HMI module and an HUD (Head-Up Display) message display operation of a HUD Module, when the first and second current object image data matching the reference object-specific data are separately stored in the storage unit.

\* \* \* \* \*